United States Patent
Oda et al.

(10) Patent No.: US 7,242,828 B2
(45) Date of Patent: Jul. 10, 2007

(54) OPTICAL CIRCUIT IN WHICH FABRICATION IS EASY

(75) Inventors: Mikio Oda, Tokyo (JP); Koji Soejima, Tokyo (JP); Sakae Kitajo, Tokyo (JP)

(73) Assignee: NEC Corporation, Tokyo (JP)

( * ) Notice: Subject to any disclaimer, the term of this patent is extended or adjusted under 35 U.S.C. 154(b) by 115 days.

(21) Appl. No.: 10/681,019

(22) Filed: Oct. 8, 2003

(65) Prior Publication Data

US 2004/0108593 A1    Jun. 10, 2004

Related U.S. Application Data

(63) Continuation of application No. 09/796,257, filed on Feb. 28, 2001, now Pat. No. 6,670,208.

(30) Foreign Application Priority Data

Jun. 23, 2000  (JP) .............................. 2000-189043
Dec. 4, 2000   (JP) .............................. 2000-368960

(51) Int. Cl.
    *G02B 6/26* (2006.01)
(52) U.S. Cl. .......................................... 385/31; 385/14
(58) Field of Classification Search ..................... None
    See application file for complete search history.

(56) References Cited

U.S. PATENT DOCUMENTS

| | | | |
|---|---|---|---|
| 5,187,367 A * | 2/1993 | Miyazaki et al. ............ 250/306 |
| 5,221,415 A * | 6/1993 | Albrecht et al. ................. 216/2 |
| 5,379,357 A | 1/1995 | Sentsui et al. |
| 5,450,246 A * | 9/1995 | Jain ............................ 359/877 |
| 5,492,607 A | 2/1996 | Yap |
| 5,518,965 A | 5/1996 | Menigaux et al. |
| 5,684,616 A * | 11/1997 | Brotz ......................... 359/198 |
| 5,701,374 A * | 12/1997 | Makiuchi ...................... 385/49 |
| 5,717,803 A | 2/1998 | Yoneda et al. |
| 5,793,914 A | 8/1998 | Sasaki |
| 5,808,293 A * | 9/1998 | Yang ............................ 438/57 |

(Continued)

FOREIGN PATENT DOCUMENTS

CA         1277525        12/1990

(Continued)

OTHER PUBLICATIONS

Masataka Itoh, et al. "Use of AuSn Solder Bumps in Three-Dimensional Passive Aligned Packaging of LD/PD Arrays on Si Optical Benches" 46th Electronic Component & Technology Conference, p. 1-7, 1996, month unknown.

(Continued)

*Primary Examiner*—Rodney Bovernick
*Assistant Examiner*—Mike Stahl
(74) *Attorney, Agent, or Firm*—Scully, Scott, Murphy & Presser, P.C.

(57) ABSTRACT

In a method for fabricating an optical circuit, a mirror element with a protection film formed within a die of a semiconductor is connected to a substrate at a predetermined position. The mirror element with the protection film connected to the substrate is peeled from the die of the semiconductor. The protection film is removed to expose a reflection surface of a reflection film of the mirror element.

10 Claims, 20 Drawing Sheets

U.S. PATENT DOCUMENTS

| | | | |
|---|---|---|---|
| 5,866,021 A * | 2/1999 | Yagi et al. | 216/84 |
| 5,923,637 A * | 7/1999 | Shimada et al. | 369/126 |
| 5,929,500 A | 7/1999 | Yoneda et al. | |
| 5,982,009 A * | 11/1999 | Hong et al. | 257/414 |
| 6,075,239 A | 6/2000 | Aksyuk et al. | |
| 6,094,293 A | 7/2000 | Yokoyama et al. | |
| 6,174,416 B1 | 1/2001 | Magenau et al. | |
| 6,201,226 B1 * | 3/2001 | Shimada et al. | 250/201.3 |
| 6,252,252 B1 | 6/2001 | Kunii et al. | |
| 6,283,601 B1 | 9/2001 | Hagelin et al. | |
| 6,417,107 B1 | 7/2002 | Sekimura | |
| 6,504,107 B1 | 1/2003 | Kragel | |
| 6,583,914 B1 * | 6/2003 | Muller et al. | 359/212 |
| 2003/0123786 A1 * | 7/2003 | Yee | 385/16 |

FOREIGN PATENT DOCUMENTS

| | | |
|---|---|---|
| CA | 2230664 | 7/1998 |
| CA | 2277471 | 7/1998 |
| CA | 2288920 | 6/2000 |
| CA | 2299832 | 9/2000 |
| JP | 59-7916 | 1/1984 |
| JP | 64-017015 | 1/1989 |
| JP | 64-59303 | 3/1989 |
| JP | H4-333004 | 11/1992 |
| JP | H6-84455 | 3/1994 |
| JP | 7-159658 | 6/1995 |
| JP | 9-8273 | 1/1997 |
| JP | 9-218304 | 8/1997 |
| JP | 2687859 | 8/1997 |
| JP | H9-257811 | 10/1997 |
| JP | H10-170765 | 6/1998 |
| JP | 2000-121967 | 4/2000 |
| JP | 3076465 | 6/2000 |
| JP | 2000-221419 | 8/2000 |
| JP | 2000-258704 | 9/2000 |
| WO | WO98/15676 | 4/1998 |

OTHER PUBLICATIONS

J. Mohr, "Moems Fabricated by the Liga Technique—An Overview" p. 221-226, date unknown.

Hiroyuki Fujita, et al. "Optical MEMS", IEICE Trans. Electron., vol. E83-C, No. 9, Sep. 2000.

L.Y. Lin, et al., "High-Density Micromachined Polygon Optical Crossconnects Exploiting Network Connection-Symmetry" p. 1425-1427, 1998, (October).

R. Jebens, et al. "Microactuators for Aligning Optical Fibers" Sensors and Actuators vol. 20, p. 65-73, 1989, month unknown.

* cited by examiner

OPTICAL AXIS

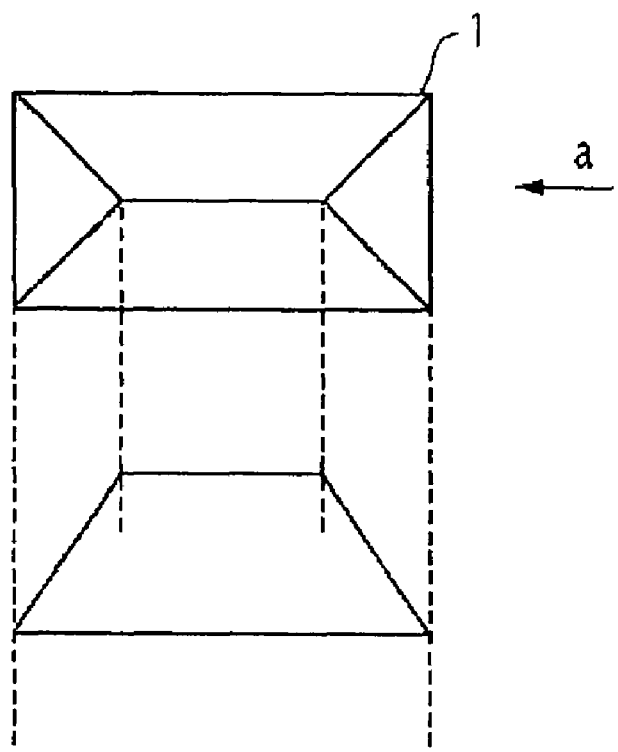
Fig. 9A
Fig. 9B
Fig. 10
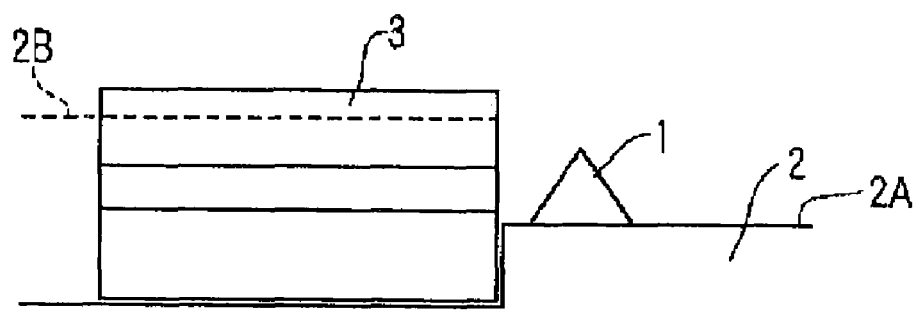

OPTICAL CIRCUIT IN WHICH FABRICATION IS EASY

RELATED APPLICATION

This application is a continuation of U.S. application Ser. No. 09/796,257, filed Feb. 28, 2001 now U.S. Pat. No. 6,670,208.

BACKGROUND OF THE INVENTION

1. Field of the Invention

The present invention relates to an optical circuit and a method for fabricating the same.

2. Description of the Related Art

Request for a large capacity of data transmission have been increased. A parallel transmission has been discussed for carrying out the data transmissions between computer terminals, between switches and between large computers, in a real time and in parallel. Also, the provision of an advanced information service to a home has been discussed. The spread of optical communication is desired for the sake of such large capacity of data transmission.

For the optical communication is used an optical module composed of optical elements such as an optical fiber, a semiconductor laser (LD), a light emission diode (LED), a photo-diode (PD), an optical switch, an optical isolator and an optical waveguide. The application field of the optical element used in such an optical module is expanded since its property and its function are made higher. The cost-down of not only an individual optical element but also the optical module is required to provide the advanced information service to the home. In order to attain the cost-down, the optical module is desirably fabricated in not a coaxial type module structure in which optical elements are arrayed in a form of block, but a flat type optical module structure in which a plurality of optical elements are arrayed on a same substrate.

FIG. 1 shows an optical circuit of a bi-directional communication module in a first conventional example. A semiconductor laser LD 102, a photo-diode PD 103, an optical waveguide 104, a wavelength filter 105 and an optical fiber 106 are mounted on a Si substrate 101. Light having the wavelength of 1.3 μm is emitted from the semiconductor laser LD 102 as a light source to the optical waveguide 104, travels through the wavelength filter 104 and then transmitted to a reception side through the optical fiber 106 as a transmission path. Signal light having the wavelength of 1.5 μm is sent through the optical fiber 106, and is inputted to the optical waveguide 104. The optical path of the signal light is changed to an adjacent waveguide by the wavelength filter 105, and then inputted to the photo-diode PD 103. Thus, the reception of the signal light is carried out. In this way, a small transmission/reception optical module can be attained by use of the flat optical circuit. Grooves are formed on the Si substrate 101 by use of the well-known semiconductor processing technique and used to position the optical waveguide 104, the wavelength filter 105 and the optical fiber 106.

As the optical elements are contained optical elements such as a surface light emission element, a surface light reception element, an end surface light emission element and an end surface light reception element. In the surface light emission element and the surface light reception element, an optical axis is oriented to a direction vertical to a substrate surface. In end surface light emission element and the end surface light reception element, an optical axis is oriented to a direction horizontal to a substrate surface. When two kinds of the optical elements in which the directions of the optical axes are orthogonal to each other are mixed and mounted on the same substrate, it is necessary to change or convert the optical path by 90 degrees. Masataka Itoh et al., (46-th, Electronic Component & Technology Conference, p.1) (a second conventional example) propose an optical path change technique. In this technique, as shown in FIG. 2, an optical path of output light from the optical fiber 106 is changed into the direction of the photo-diode PD 103 by reflecting the output light on a slant surface 109 formed by an anisotropic etching of the silicon substrate 101. In this method, however, the substrate material is limited to the silicon. Thus, the method cannot be applied to other substrates.

A prism for an optical path change is known from Japanese Laid Open Patent Application (JP-A-Heisei, 7-159658) (a third conventional example), as shown in FIG. 3. An optical path of a light beam 107 emitted from the optical waveguide 104 is changed by 90 degrees by a prism 108 or a reflection surface 109 of a reflection mirror. In this case, if the prism having the size of 1 mm or less is used, a fabrication cost of the prism is expensive to further increase a fabrication cost of the optical module.

FIG. 4 shows an installation example of an optical element when the optical path is not changed (a fourth conventional example). In order to mount the light receiving surface of a photo-diode PD 103 in a direction orthogonal to the surface of a substrate 101, it is necessary to newly carry out position adjustment three-dimensionally. Also, it is necessary to add another substrate 110 for supporting the photo-diode PD 103 and a part for fixing the substrate at the adjusted position. Thus, the fabrication cost is further increased.

Light emitted from a light emission element such as a light emission diode and a laser diode spreads to have a certain radiation angle. Even if a waveguide or an optical fiber is closely disposed near the emission portion of the light emission element, there may be a case that the whole emission light cannot be received. Such a case results in an optical loss. For the reduction in the optical loss, a small lens having an excellent light collection performance needs to be used. However, it is difficult to fabricate such a small lens.

In conjunction with the above-mentioned description, Japanese Laid Open Patent Application (JP-A-Showa, 59-7916) discloses a system for coupling a laser diode and a single mode of optical fiber. According to this reference, a curved surface is formed on one end surface or both end surfaces of a self-collection type lens. The lens is disposed between the laser diode and the single mode of optical fiber.

Also, Japanese Laid Open Patent Application (JP-A-Heisei, 7-159658) discloses a coupling structure between an optical waveguide and an optical element. In this reference, the optical waveguide is formed by laminating the dielectrics different from each other. The optical waveguide is formed on a dielectric substrate. In front of an end of the optical waveguide on the side on which the optical element is disposed, a groove is formed on the dielectric substrate to have a bottom surface parallel to a surface of the optical waveguide. A prism is disposed in a groove in which an optical axis of the optical waveguide is coincident with an optical axis of the disposed optical element. The optical element is mounted on the dielectric substrate so that it strides over the prism and the optical waveguide. Metallic coat is formed on one surface of the prism and the bottom surface of the groove. Moreover, a solder sheet is disposed on the surface of the metal coat on the bottom surface of the groove, or the solder layer is formed thereon. The prism is disposed in such a manner that the surface of the prism on which the metal coat is performed faces to the surface of the sheet or the top surface of a solder layer. The dielectric substrate and the prism are heated to thereby melt the solder. Thus, the prism is coupled to the dielectric substrate.

A light connection integrated circuit is disclosed in Japanese Laid Open Patent Application (JP-A-Heisei, 9-8273). In this reference, each of first and second reflective optical elements has at least three planes orthogonal to each other and a plane parallel to one of the three planes, and further has a reflection plane that is orthogonal to the two planes parallel to each other and disposed for the other plane at a preset angle. Each of the first and second reflective optical elements is formed of transparent material. A flat substrate has a flat surface on which the first and second reflective optical elements are disposed. A first integrated circuit having a light emission device for outputting an optical signal and a second integrated circuit having a light reception device for receiving the optical signal are disposed on a flat surface opposite to the flat substrate of the integrated circuit substrate. The first reflective optical element converts an orientation of the optical signal outputted by the light emission device of the first integrated circuit into an orientation parallel to the flat surface of the flat substrate. The second reflective optical element changes the orientation of the optical signal parallel to the flat surface of the flat substrate so that it is inputted to the light reception device of the second integrated circuit.

Also, an optical path changing method is disclosed in Japanese Patent No. 2,687,859. In this reference, a micro lens is disposed on a mount substrate or a sub-substrate different from the mount substrate. An outer side of the micro lens is used as a light reflection surface. Then, the optical path is converted by about 90 degrees from a horizontal direction to a vertical direction, or reverse. The outer surface of the micro lens may be a spherical surface, or metal coating may be performed on the surface of the micro lens.

SUMMARY OF THE INVENTION

Therefore, an object of the present invention is to provide an optical path change device that can be fabricated at a low cost, and a method for fabricating the same.

Another object of the present invention is to provide an optical element in which the change of an optical path and the collection of light can be carried out, and a method for fabricating the same.

Still another object of the present invention is to provide an optical circuit using one of the above-mentioned optical elements, and a method for fabricating the same.

Yet still another object of the present invention is to provide an optical circuit that can be fabricated at a low cost, and a method for fabricating the same.

Another object of the present invention is also to provide an optically flat circuit in which optical elements are easily mounted, and a method for fabricating the same.

In an aspect of the present invention, a method for fabricating an optical circuit is attained by: (a) joining a mirror element with a protection film formed within a die of a semiconductor to a substrate at a preset position; (b) stripping the mirror element with the protection film joined to the substrate from a die of the semiconductor; and (c) removing the protection film so as to expose a reflection surface of a reflection film of the mirror element.

The mirror element with the protection film may be installed to a tip of at least one cantilever of the substrate. At this time, in the method, an expending and contracting member for moving the tip upwardly and downwardly may be installed below the mirror element or below the tip. The expending and contracting member is desired to be one of a piezoelectric element, an electric distortion actuator, a magnetic distortion actuator, and a phase transition material.

Also, the (b) stripping step may comprise the step of thinning a thickness of the protection film in a periphery of the mirror element, and the (c) removing step may comprise the step of removing the protection film by a wet etching.

Also, the (a) joining step may be attained by: (d) forming the protection film so as to cover an inner surface of a concave corresponding to the die of the semiconductor; and (e) forming a reflection film of the mirror element so as to at least cover the protection film in the concave. In this case, the (e) forming step may comprise the step of forming the reflection film by use of an electrolytic plating method.

Here, the reflection film is desired to be one of: a gold film; a lamination film of rhodium film-nickel film-gold film; a lamination film of platinum film-nickel film-gold film; a lamination film of palladium film-nickel film-gold film; a lamination film of gold-nickel film-gold film; a lamination film of nickel-boron alloy film-nickel film-gold film; a lamination film of nickel film-gold film; a lamination film of chrome film-nickel film-gold film; a photosensitive polyimide film; a lamination film of gold film-(Ni—P) film/Ni film-P film-Au film; and a lamination film of Au film-Pt film-Au film.

Also, it is desirable to fill a remaining concave after the formation of the reflection film with a preset material. The preset material is a resin composition containing an active energy line polymerization initiator and an active energy line reaction resin.

Also, the mirror element has a join auxiliary film in a direction of the reflection surface, and the (a) joining step may be attained by: joining the join auxiliary film to the substrate; and joining the mirror element to the preset position of the substrate after said strip.

Also, the reflection surface of the mirror element may have a flat surface or a concave surface.

From another viewpoint of the present invention, a method for fabricating a mirror element is attained by: (a) joining a mirror element with a protection film formed within a die of a semiconductor to a substrate at a preset position; (b) stripping the mirror element with the protection film joined to the substrate from a die of the semiconductor; and (c) forming a reflection film of the mirror element on the protection film.

At this time, the mirror element with the protection film may be installed to a tip of at least one cantilever of the substrate. Also, the method may further comprise the step of installing an expending and contracting member for moving the tip upwardly and downwardly below the mirror element or below the tip. In this case, the expending and contracting member is desired to be one of a piezoelectric element, an electric distortion actuator, a magnetic distortion actuator, and a phase transition material.

Also, the (b) stripping step comprises the step of thinning a thickness of the protection film in a periphery of the mirror element.

Also, the (a) joining step may be attained by: (d) forming a protection film so as to cover an inner surface of a concave corresponding to the die of the semiconductor; and (e) forming the mirror element so as to at least cover the protection film in the concave.

Also, the (e) forming step may comprise the step of filling a remaining concave after the formation of the mirror element with a preset material. In this case, the preset material is desired to be a resin composition containing an active energy line polymerization initiator and an active energy line reaction resin.

A reflection surface of the mirror element may have a flat surface or a concave surface.

From still another viewpoint of the present invention, a method for fabricating a mirror element is attained by: (a) forming a protection film so as to cover an inner surface of a die formed in a semiconductor; (b) forming a mirror element film so as to at least cover the protection film in the inner surface of the die; and (c) stripping from the semiconductor substrate the mirror element film together with the protection film.

The method may comprise the step of: (d) removing the protection film from the mirror element so that the mirror element film functions as a reflection film, and (e) forming a reflection film on the protection film on the protection film mirror element film.

Also, the reflection film is desired to be one of a lamination film of chrome film-gold film, a lamination film of a chrome film-aluminum film, a lamination film of chrome film-silver film, a lamination film of chrome film-copper film, a lamination film of chrome film-palladium film, a lamination film of chrome film-titanium film, and a lamination film of chrome film-nickel film.

Also, the (a) forming step may be attained by: (f) forming the protection film so as to cover the inner surface of the die formed in the semiconductor; and (g) forming the mirror element film so as to at least cover the protection film in the inner surface of the die. The mirror element film is desired to be formed by use of an electrolytic plating method. The mirror element film is desired to be one of: a gold film; a lamination film of rhodium film-nickel film-gold film; a lamination film of platinum film-nickel film-gold film; a lamination film of palladium film-nickel film-gold film; a lamination film of gold-nickel film-gold film; a lamination film of nickel-boron alloy film-nickel film-gold film; a lamination film of nickel film-gold film; a lamination film of chrome film-nickel film-gold film; a photosensitive polyimide film; a lamination film of gold film-(Ni—P) film/Ni film-P film-Au film; and a lamination film of Au film-Pt film-Au film.

Also, a remaining concave after the formation of the mirror element film may be filled with a preset material. The preset material is desirable to be one of a resin composition containing an active energy line polymerization initiator and an active energy line reaction resin. Also, the active energy line reaction resin is one of phenol novolak type epoxy resin, cresol/volak type epoxy resin, glycylamine type epoxy resin and biphenyl type epoxy resin. Also, the active energy line reaction resin is desired to be substance in which unsaturated-base-acid, such as acrylic acid, methacrylic acid, crotonic acid, maleic acid, maleic acid monomethyl, maleic acid monopropyl, maleic acid monobutyl, sorbic acid and the like, reacts with epoxy resin having fluorene skeleton, or epoxy resin portion of bromide of epoxy resin having fluorene skeleton, and it is made into ester. Also, the active energy line polymerization initiator is one kind or two kinds or more among a benzophenone class, a benzildi-methylkethal class and a compound of a thio-xanthone system.

Also, the (a) forming step may comprise the step of etching a silicon substrate and forming a concave corresponding to the die. In this case, the inner surface of the concave is one of a (100) surface and a (111) surface. Also, the concave is one of a pyramid type and a triangular pole type in which both ends are cut down.

Also, the (c) stripping step may comprise the step of thinning the protection film in a periphery of the mirror element film.

Also, the (c) stripping step may comprise the step of stripping the mirror element film from the die of the semiconductor after the mirror element film is joined to the substrate. In this case, the mirror element film is desired to have a join film portion used to join to the substrate in a direction orthogonal to an optical axis at a time of a usage.

BRIEF DESCRIPTION OF THE DRAWINGS

FIG. 9A is a plan view showing the mirror element;

FIG. 9B is a front view showing the mirror element;

FIG. 10 is a sectional view showing a substrate on which the mirror element and an optical fiber are mounted;

DESCRIPTION OF THE PREFERRED EMBODIMENTS

An optical circuit according to the present invention will be described below in detail with reference to the attached drawings.

Figure 1:
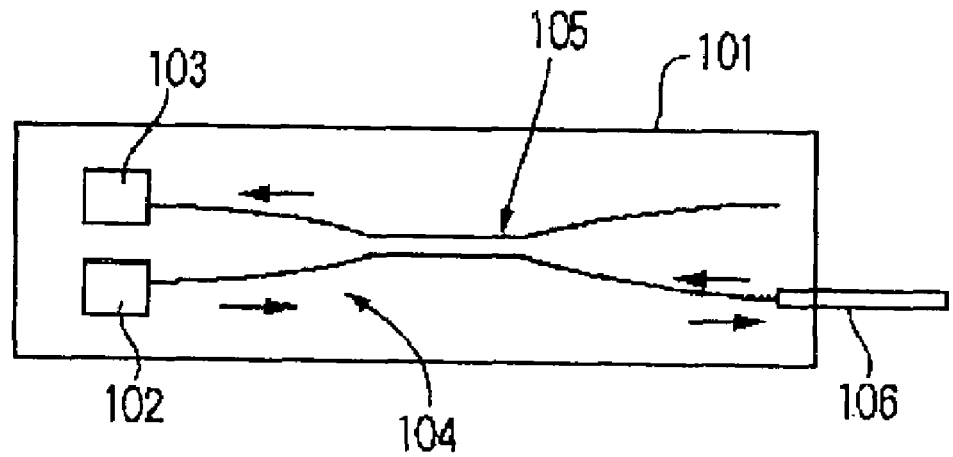
FIG. 1 is a plan view showing a first conventional example of an optical circuit.
Figure 2:
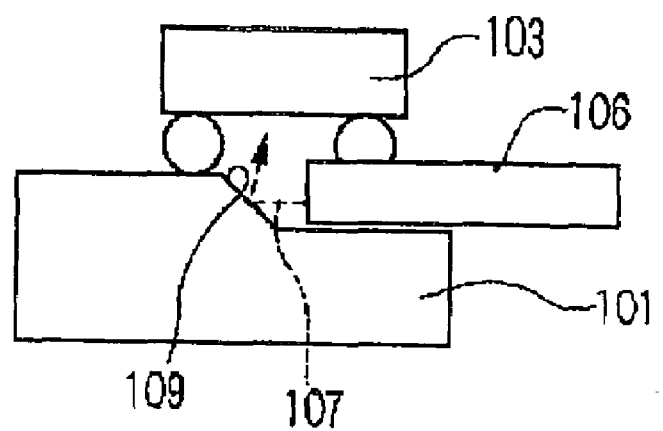
FIG. 2 is a front view showing a second conventional example of the optical circuit.
Figure 3:
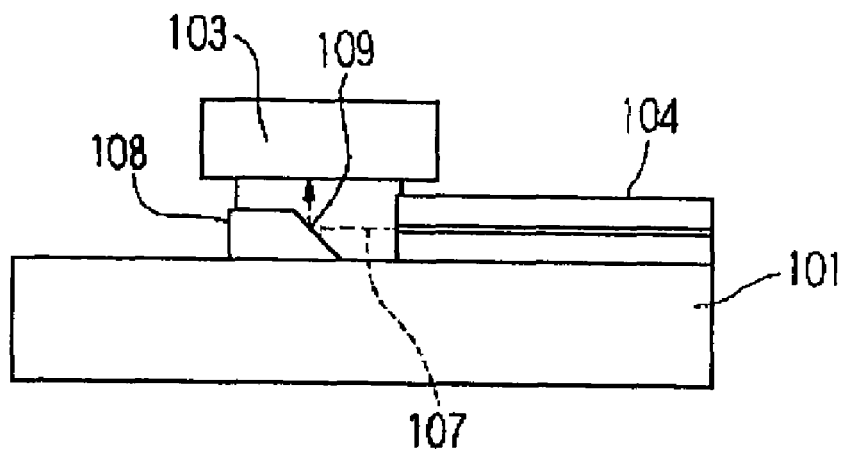
FIG. 3 is a front view showing a third conventional example of the optical circuit.
Figure 4:
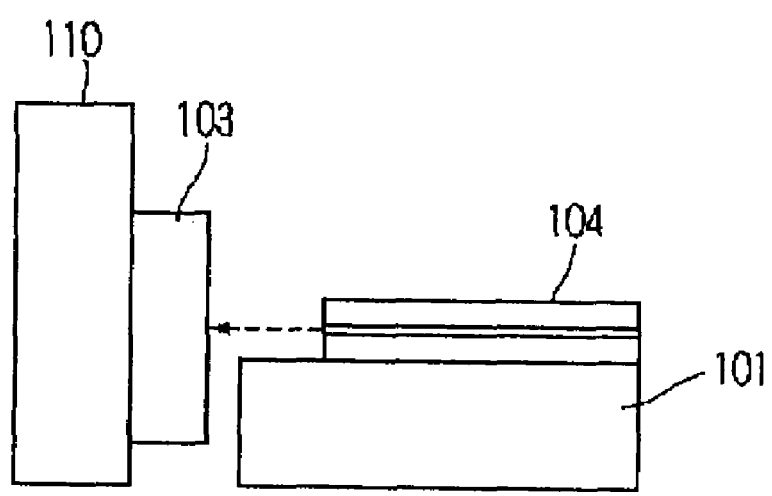
FIG. 4 is a front view showing a fourth conventional example of the optical circuit.
Figure 5:
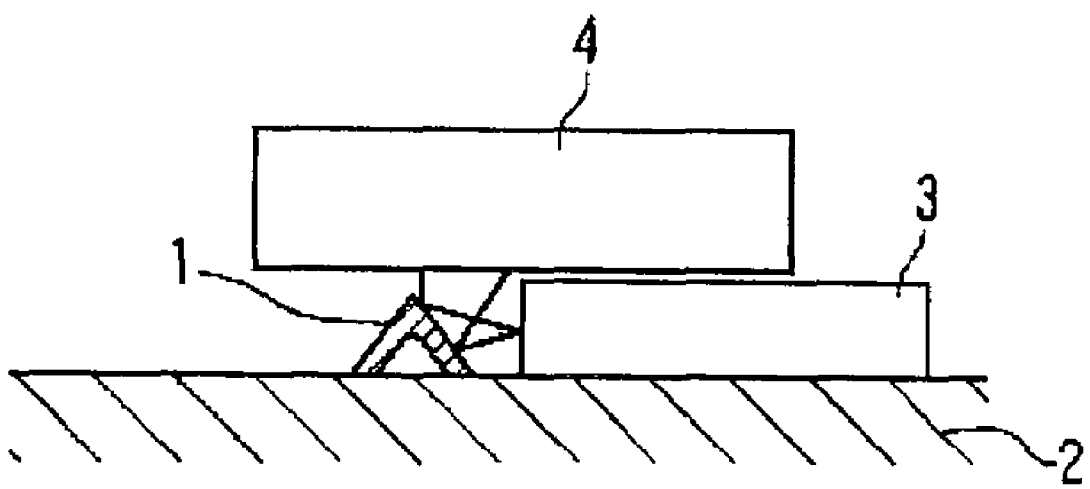
FIG. 5 is a partial sectional view showing a structure of an optical circuit according to a first embodiment of the present invention.

FIG. 5 is a sectional view showing a structure of the optical circuit according to the first embodiment of the present invention. Referring to FIG. 5, a mirror element 1, an optical guide device 3 and a light emission/reception element 4 are mounted on an optical circuit substrate 2. The optical guide device 3 is an optical waveguide or an optical fiber, for example. The light emission/reception element 4 is a photo-diode or a surface light emission type laser element, for example.

A reflection surface of the mirror element 1 has the angle of about 45 degrees with respect to an optical axis of a light source. The reflection surface of the mirror element 1 is made of a metal film. The connection between the mirror element 1 and the optical circuit substrate 2 is made of a metal film or resin. A light beam outputted from the optical guide device 3 is reflected on the mirror element 1 and guided to the light reception element 4. A light beam outputted from the light emission element 4 such as a surface light emission type laser is reflected on the mirror element 1 and inputted to the optical guide device 3.

FIGS. 6A to 6H show a first fabricating method for the mirror element 1 used in the optical circuit according to the first embodiment of the present invention. This mirror element 1 has the shape that both ends on one ridgeline of a pole portion of a triangular-prism shape are cut down toward an opposite side.

A die is used to fabricate the mirror element 1. A metal film is formed within the die such that a reflection surface is formed. The mirror element 1 is coupled to the optical circuit substrate 2 on a predetermined position. The minute mirror element 1 is not treated as a single body. The die in which the mirror element 1 is formed is treated, and the mirror element 1 is coupled to the optical circuit substrate 2. Thus, the mirror element 1 can be easily mounted on the optical circuit substrate 2 at a high accuracy and at a cheaper cost.

Figure 6A:
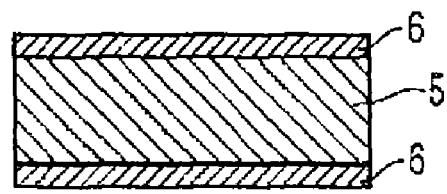
FIGS. 6A to 6H are sectional views showing a first method for forming a mirror element used in the first embodiment.
Figure 6B:
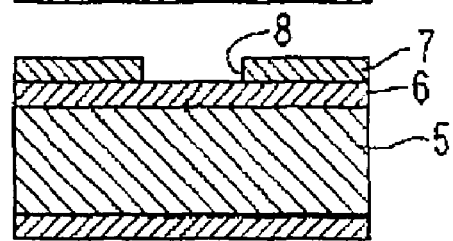

The die used to fabricate the mirror element 1 is referred to as a silicon etch pit. As shown in FIG. 6A, thermal oxide films 6 are formed on both surfaces of a silicon wafer 5 having the crystal orientation (100) to have the thickness of 1 μm. The silicon wafer 5 has the diameter of 6 inches and the thickness of 1 mm. Subsequently, as shown in FIG. 6B, a photo-resist layer 7 is coated on the thermal oxide film 6 on one side to have the thickness of 5 μm. After the photo-resist layer 7 is exposed by use of a desired mask, the silicon wafer 5 is developed and rinsed. Thus, the photo-resist layer 7 is patterned, and a first opening 8 is formed. The first opening 8 has the size of the longitudinal length of 70 μm×the lateral length of 100 μm.

Figure 6C:
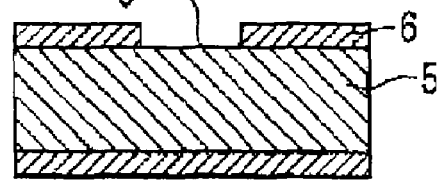
Figure 6D:
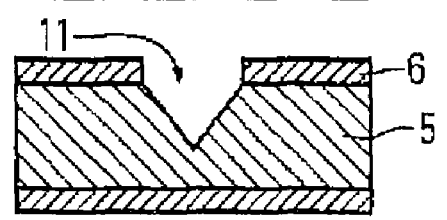
Figure 6E:
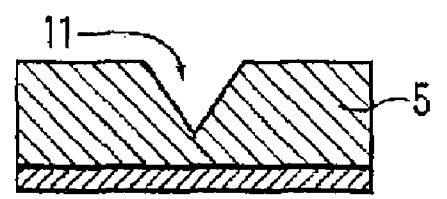

Next, as shown in FIG. 6C, the silicon wafer 5 with the first opening 8 is immersed in buffered hydrofluoric acid so that the thermal oxide film 6 is etched from the surface of the silicon wafer 5. After the silicon wafer 5 is washed or rinsed, the photo-resist layer is removed by solvent, and the silicon wafer 5 is rinsed. In this way, a second opening 9 is formed in the thermal oxide film 6. Subsequently, as shown in FIG. 6D, the exposed portion of the silicon wafer 5 is anisotropically etched by potassium hydroxide solution, so that a concave portion 11 having (111) surface is formed. Then, as shown in FIG. 6E, the oxide film 6 remaining on the side on which the concave portion 11 of the silicon wafer 5 is formed is perfectly etched by buffered hydrofluoric acid.

Figure 6F:
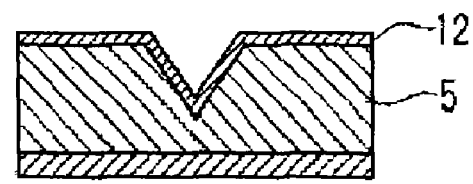
Figure 6G:
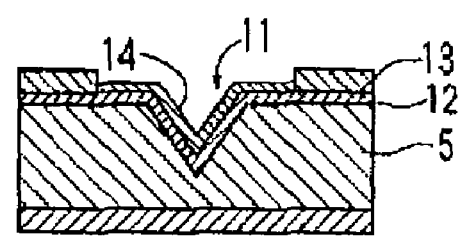

Next, as shown in FIG. 6F, a copper film 12 is formed on the surface of the side on which the concave portion of the silicon wafer 5 is formed by a sputtering method to have the thickness of 1 μm. Subsequently, as shown in FIG. 6G, a photo-resist layer 13 is coated on the copper film 12. The photo-resist layer 13 is exposed, developed and patterned.

Figure 6H:
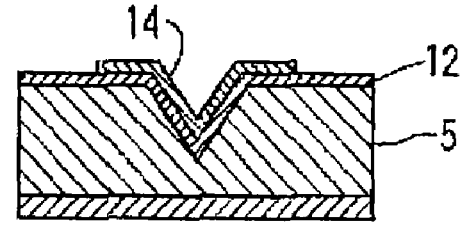

Next, an Au film 14 is formed on the copper film 12 by an electrolytic plating method to have the thickness of 5 μm. Subsequently, as shown in FIG. 6H, the photo-resist layer 13 is removed by solvent. Then, the silicon wafer 5 is immersed in etching solution composed of sulfuric acid of 5% and hydrogen peroxide water of 5%. The copper film 12 is etched by 0.8 μm. Through this step, the copper film 12 is made thin. Thus, it is possible to suppress stress at a time of removal of the mirror element 1 at a later process, resulting in reduction of a defect.

Figure 7:
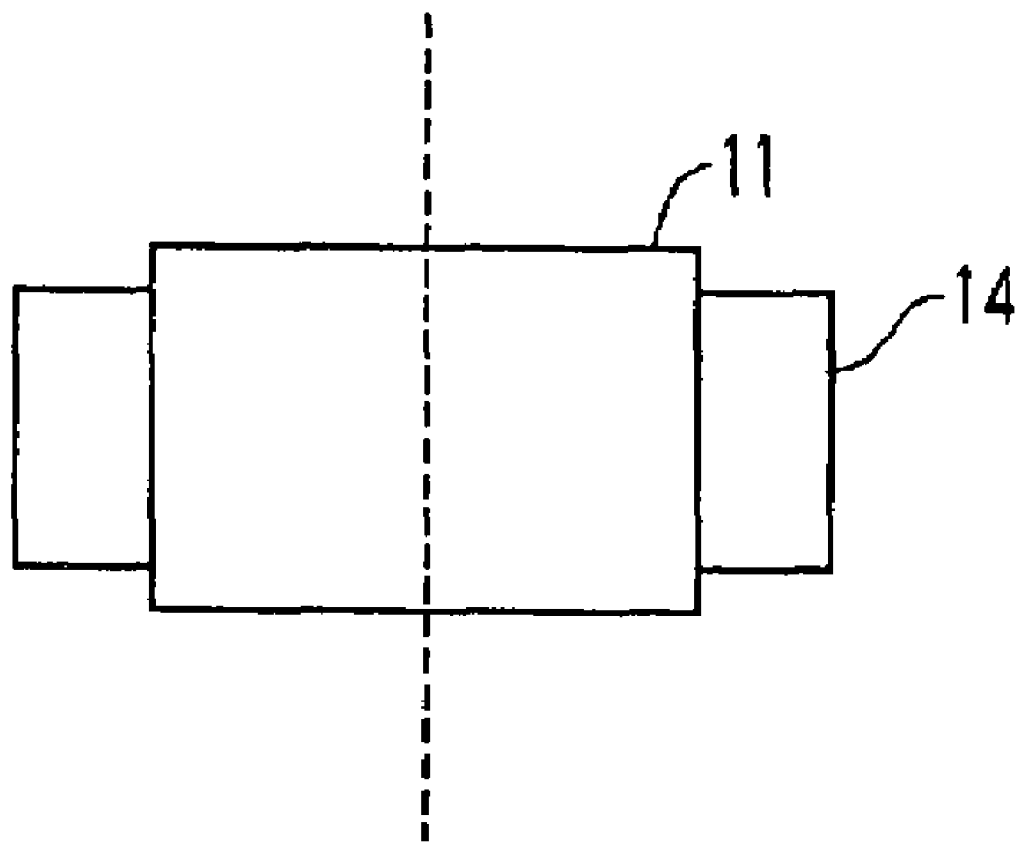
FIG. 7 is a plan view showing a mirror on the way of fabrication of the mirror element.

It should be noted that portions 14 (FIG. 7) extending in a lateral direction of the Au film can be used as connection portions to the optical circuit substrate 2. In this case, resin may be filled in the space of the concave portion 11 after the formation of the Au film. Also, FIG. 7 is a plan view showing a die 5 for the mirror element 1 formed as mentioned above. The optical axis of an incident light is shown by a dashed line. As shown in FIG. 7, the mirror element 1 formed in the concave portion 11 of the die 5 has connection portions 14 to the optical circuit substrate 2 on both ends. The connection portions 14 are disposed in a direction orthogonal to an incident direction of a light beam.

Figure 8A:
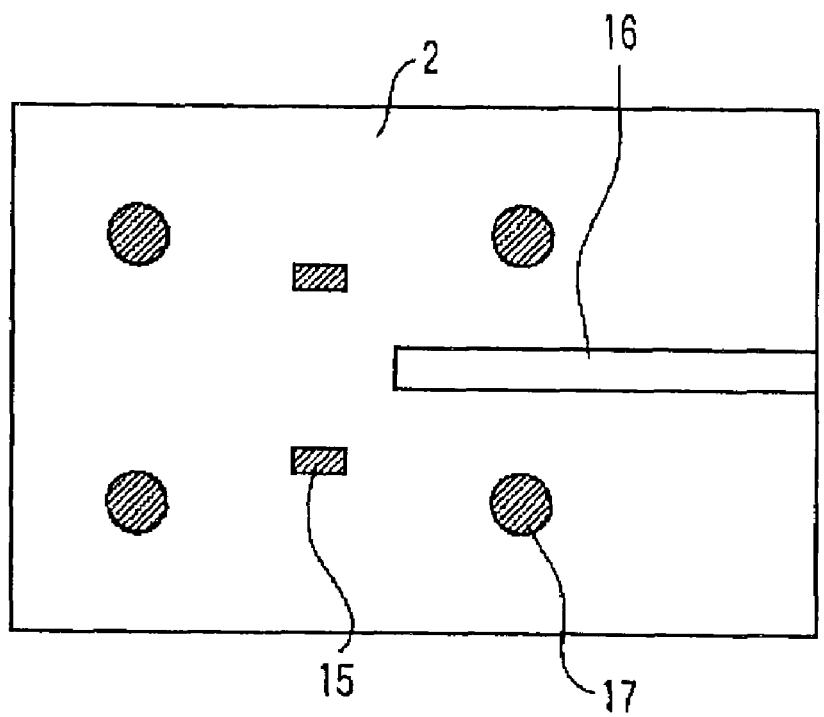
FIG. 8A is a plan view showing a substrate on which the mirror element should be mounted in the first embodiment of the present invention.
Figure 8B:
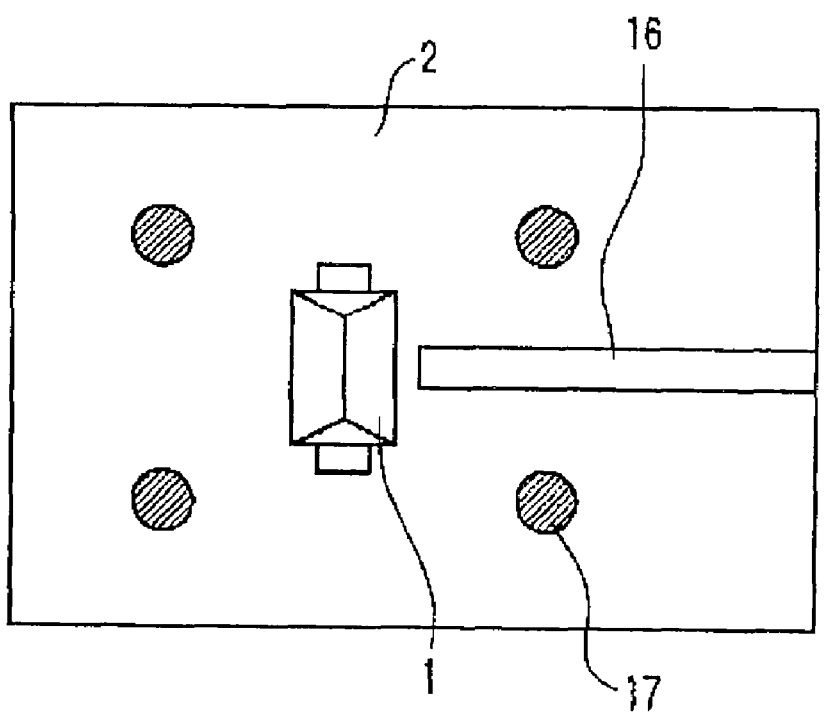
FIG. 8B is a plan view showing the substrate after the mirror element is mounted.

Next, the mirror element 1 is connected to the optical substrate 2. As shown in FIG. 8A, connection pads 15 for the mirror element 1 are formed on the optical circuit substrate 2 by a gold plating method. Besides, a groove 16 for fixing an optical fiber and optical element connection electrodes 17 are formed. The optical circuit substrate 2 and the silicon wafer 5 on which the Au films 14 are formed are adjusted in position by a connection unit (not shown). After that, the Au films 14 are connected to the optical circuit substrate 2 under the condition of the temperature of 370° C. and the pressure of 1 N/cm$^2$(100 g Weight/cm$^2$). Then, the silicon wafer 5 is lifted up. At this time, the copper film 12 is peeled from the silicon wafer die 5. The mirror element 1 remains on the optical circuit substrate 2 in a state in which the mirror element 1 is covered by the copper film 12. FIG. 8B shows the mirror element 1 after the movement onto the optical circuit substrate 2. FIG. 9A is a plan view showing the mirror element 1 after the mount, and FIG. 9B is a front view showing the mirror element 1. The mirror element 1 has the shape that both upper ends of a triangular-prism shape in an axis direction a are cut away in a slant direction.

The optical circuit substrate 2 on which the mirror element 1 is left is immersed in etching solution composed of sulfuric acid of 5% and hydrogen peroxide water of 5%, so that the copper film 12 on the Au film 14 is etched. Thus, the Au film 14 is exposed. Subsequently, an optical fiber 3 and a photo-diode PD 4 are mounted on the optical circuit substrate 2, respectively. When a light beam is inputted to the optical fiber 3, the light beam is reflected on the mirror element 1, and inputted to a light receiving section of the photo-diode PD 4. At this time, loss caused by the reflection on the mirror element 1 is approximately similar to a reflection rate of Au.

Especially, as shown in FIG. 10, when the optical fiber 3 is disposed in a deep groove, there may be a case that an optical axis of the optical fiber 3 is located below the reflection surface of the mirror element 1 mounted on the optical circuit substrate 2. In this case, however, a portion of the optical circuit substrate to which the mirror element 1 should be connected is etched so that the reflection surface of the mirror element 1 can be coincident with the optical axis of the optical fiber. Thus, the light beam can be effectively reflected by the mirror element 1. Also, the light beam is transmitted through air between the optical fiber 3 and the mirror element 1 and between the mirror element 1 and the photo-diode PD 4. In this case, resin may be filled between the optical fiber 3 and the mirror element 1 and between the mirror element 1 and the photo-diode PD 4. If a refractive index in an outer circumference of the optical fiber 3 is 1.45, it is desirable that the resin has a refractive index between 1.34 and 1.56, namely, in a range of 1.45±0.11. This filling operation can suppress the loss caused by Fresnel reflection on air interface, resulting in reduction in the optical coupling loss.

In the above-mentioned description, the copper film 12 functions as a protective film of the reflection film (Au film) 14 and also enables the reflection film 14 to have a flat surface.

FIGS. 11A to 11H show a second fabricating method for the mirror element 1 used in the optical circuit according to the first embodiment of the present invention. The appearance of the mirror element 1 is pyramid-shaped, and the inside thereof is hollow. The mirror element 1 is composed of three layers, and an outer layer is a rhodium film. A nickel film is formed on an inner side of the rhodium film. A gold film is further formed on an inner side of the nickel film. The plane of a ring-like rectangle that is the lower surface of the mirror element 1 is composed of the gold film. Platinum, palladium, gold, nickel, nickel-boron alloy and chrome are preferably used instead of rhodium.

Figure 11A:
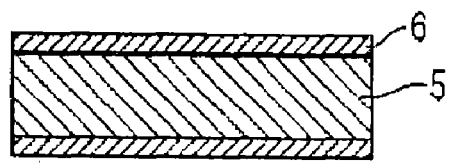
FIGS. 11A to 11H are sectional views showing a second method for forming a mirror element.
Figure 11B:
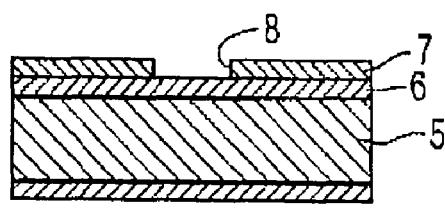

At first, as shown in FIG. 11A, a silicon wafer die 5 is prepared which has the diameter of 6 inches and the thickness of 1 mm. The silicon wafer die 5 has the crystal orientation (100) plane. The thermal oxide films 6 are formed on both sides of the silicon wafer die 5. The thickness of the thermal oxide film 6 is 1 µm. The photo-resist layer 7 is coated on a first thermal oxide film. The thickness of the photo-resist layer 7 is 5 µm. The photo-resist layer 7 is exposed by use of a mask. The silicon wafer die 5 is immersed in development solution for 10 minutes, and rinsed and patterned, so that an opening 8 is formed on the thermal oxide film 6, as shown in FIG. 11B.

Figure 11C:
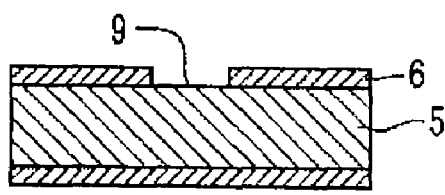
Figure 11D:
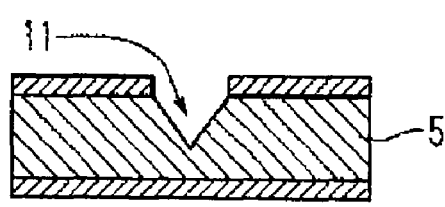
Figure 11E:
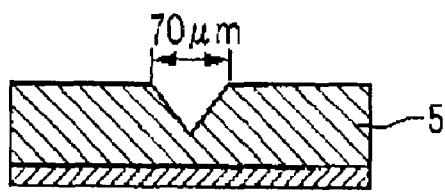

The silicon wafer die 5 on which the opening 8 has been formed is immersed in buffered hydrofluoric acid and rinsed to remove the portion of the first thermal oxide film 6 corresponding to the opening 8, as shown in FIG. 11C. After the removal, the photo-resist layer 7 is removed by solvent. Subsequently, the silicon wafer die 5 is washed to form the opening 9. Subsequently, as shown in FIG. 11D, the silicon wafer die 5 is anisotropically etched by use of potassium hydroxide solution of 10%, and a pyramid-shaped concave portion, namely, an etch pit 11 is formed. The pyramid-shaped concave portion 11 has a crystal orientation (100) plane as the concave portion surface. The pyramid-shaped concave portion 11 is rectangular on the open side, as shown in FIG. 12. The pyramid-shaped concave portion 11 is the space in a form of a quadrangular pyramid. The bottom side of the pyramid-shaped concave portion 11, namely, the side of the opening is square-shaped. The length of one side is about 70 µm as shown in FIGS. 11 and 11E. As shown in FIG. 7E, the remaining portion of the first thermal oxide film 6 is removed by buffered hydrofluoric acid.

Figure 11F:
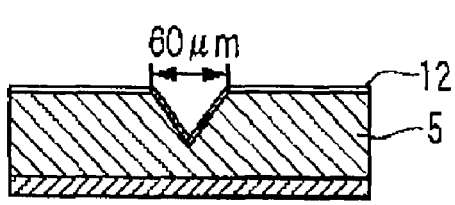
Figure 11G:
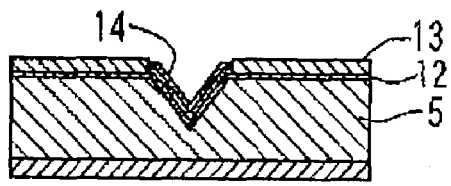
Figure 12:
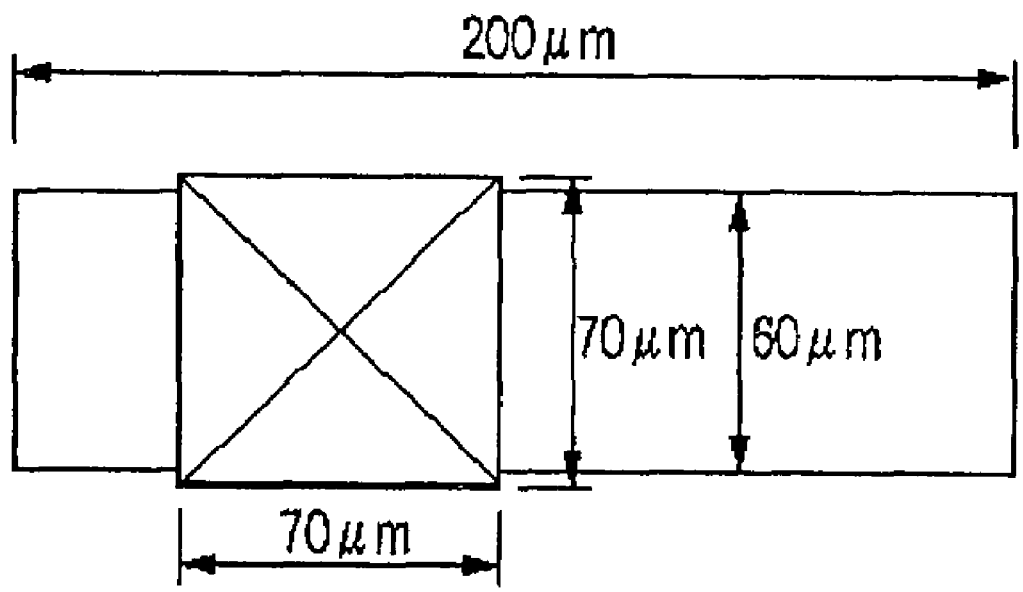
FIG. 12 is a plan view showing a concave portion for the mirror element formed by the second method.

Next, as shown in FIG. 11F, the copper film 12 is formed on the exposed surface of the silicon wafer die 5 and the pyramid-shaped concave portion 11. The thickness of the copper film 12 is 1 µm. A photo-resist layer is formed on the copper film 12. The photo-resist layer is exposed and developed by use of a preset mask. The patterned photo-resist layer 13 is formed in this way. A portion of the copper film 12 formed in the pyramid-shaped concave portion 11 is not covered by the photo-resist layer 13. The portion of the copper film 12 is exposed. An opening of the photo-resist layer 13 is rectangle-shaped. As shown in FIG. 12, the longer side is 200 µm, and the shorter side is 60 µm. A plating film 14 is formed on the surface of the quadrangular pyramid where the copper film 12 is exposed, by the electrolytic plating method. The plating film is the portion forming the mirror element 1, and is formed of three layers in the form of the quadrangular pyramid. An outer layer, namely, a bottom layer in FIG. 11G is made of a rhodium film, a nickel film is formed on an inner side of the rhodium film, and a gold film is further formed on an inner side of the nickel film. Then, the gold film is exposed. The thickness of the rhodium film is 0.1 µm, the thickness of the nickel film is 10 µm, and the thickness of the gold film is 1 µm.

Next, the photo-resist layer 13 is solved by organic solvent, and the silicon wafer die 5 is immersed in the etching solution composed of sulfuric acid of 5% and hydrogen peroxide of 5%, so that the copper film 12 is etched by the thickness of 0.8 µm. In the thus-thinned copper film 12, the stress when the copper film 12 is peeled is reduced at a later-described peeling step. As shown in FIGS. 12 and 11G, the circumference of the pyramid-shaped concave portion 11 is concealed by a photo-resist layer, and the plating film 14 is not formed on the concealed portion. Thus, when the plating film 14 is peeled from the silicon wafer die 5, the thinned copper film is easily bent by the stress because of the shapes. Hence, it is easy to carry out a peeling process.

Figure 11H:
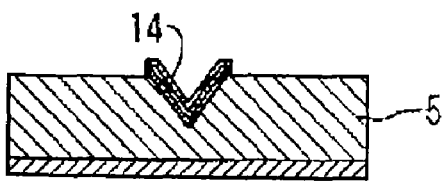

Next, as shown in FIG. 11H, the photo-resist layer 13 and the copper film 12 are removed to then complete the plating film 14 on the silicon wafer die 5.

FIGS. 13A to 13D show a method for assembling the mirror element 1 according to the first embodiment, which is fabricated by the second fabricating method, on the optical circuit substrate 2. The plating film 14 of the mirror element 1 is composed of a quadrangular-pyramid-shaped plating film portion 14A and rectangular plating films 14B integrally extending on both sides of the quadrangular-pyramid-shaped plating film portion 14A, as shown in FIG. 12.

A gold connection protrusion 18 is formed on the optical circuit substrate 2. In the gold connection protrusion 18, the horizontal sectional portion is square-shaped, and the one side is 60 μm. The height of the gold connection protrusion is 50 μm. The mirror element 1 is positioned and disposed such that a bottom surface of an end portion of the plating film 14 meets a top surface of the gold connection protrusion 18. After that, the optical circuit substrate 2 is heated to the temperature of 370° C. The silicon wafer die 5 having the mirror element 1 is pushed against the gold connection protrusion 18 in the force of 1 N (about 100 g weight). The gold connection protrusion 18 and the gold layer of the bottom layer of the mirror element 1 are connected to each other by the pushing force through this heating operation. After the completion of this connecting operation, the silicon wafer die 5 is removed from the optical circuit substrate 2. Through this removal, the mirror element 1 remains on the optical circuit substrate 2. At the time of the removal, the mirror element 1 is connected to the gold connection protrusion 18. Thus, the mirror element 1 is easily removed from the silicon wafer die 5. Since the stress is reduced as mentioned above, the removal operation is easily carried out.

As mentioned above, the whole of the optical circuit substrate 2 on which the mirror element 1 remains is immersed in etching solution composed of sulfuric acid of 5% and hydrogen peroxide of 5%, so that the copper film on the plating film 14 is removed. Through removal of the copper film, the rhodium film is exposed as the surface of the plating film 14. The rhodium film effectively reflects the light.

Figure 13A:
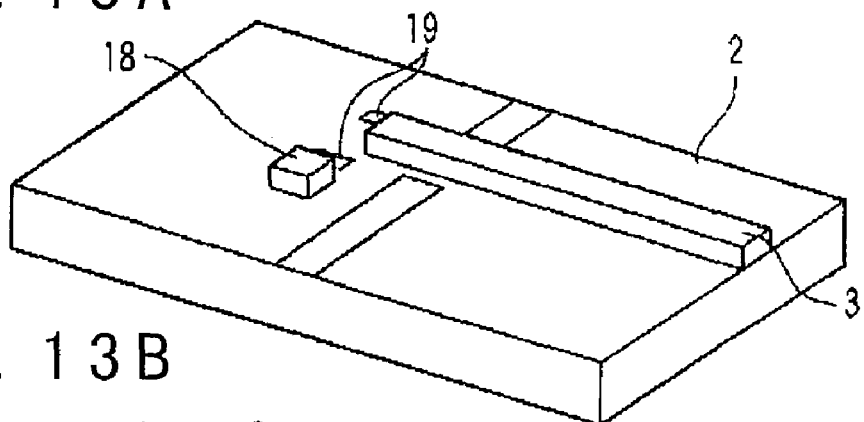
FIGS. 13A to 13D are perspective views showing a process for assembling an optical circuit.
Figure 13B:
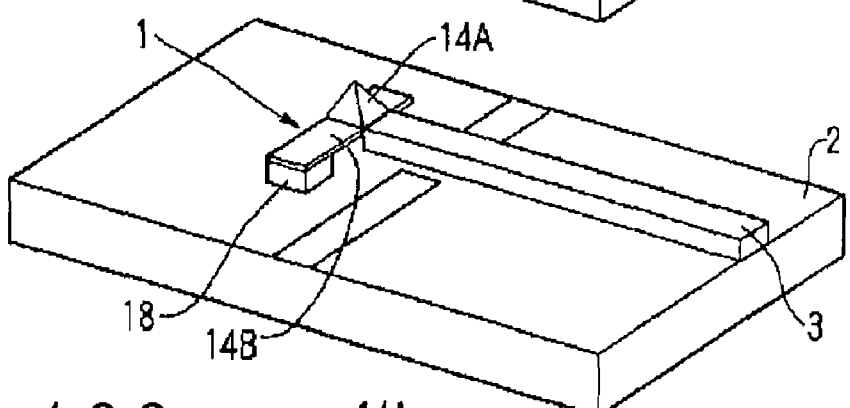
Figure 13C:
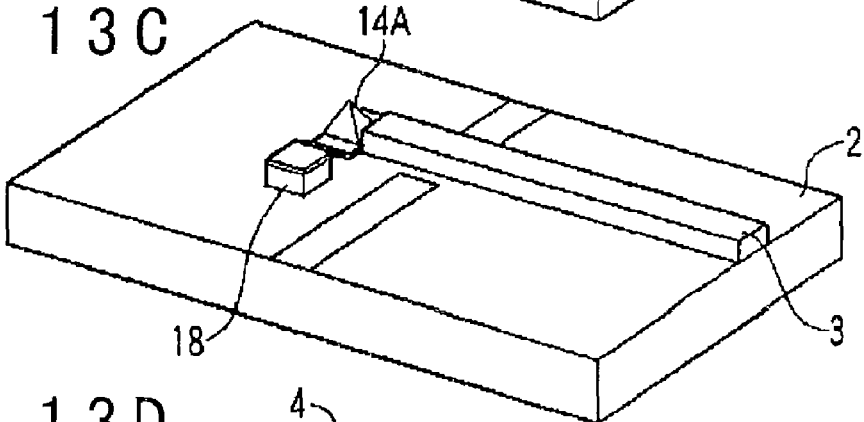
Figure 13D:
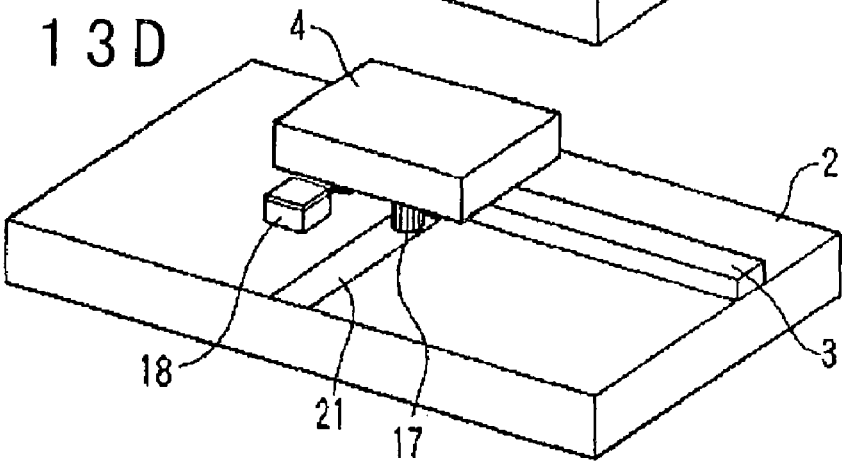

As shown in FIG. 13A, gold pads 19 are further formed on two positions on the optical circuit substrate 2. The gold pads 19 are disposed on both sides of the optical axis of the optical guide device 3. As shown in FIG. 13B, both sides of the rectangular plating portion 14B are pushed against the optical circuit substrate 2, namely, in the lower direction. Thus, as shown in FIG. 13C, the mirror element is pushed down to the optical circuit substrate 2 by a coupling method similar to a single point TAB (Tape Automated Bonding). In this way, the mirror element 1 is fixed to the gold pads 19. Heat and supersonic may be applied to the connection during this pushing operation, so that the connection is heated to 400° C. At the time of this connection operation, the position of the mirror element 1 is adjusted in both the X and Y directions. The position of the quadrangular-pyramid-shaped plating film portion 14A is adjusted within an error range of 1 μm.

The quadrangular-pyramid-shaped plating film portion 14A connected to the optical circuit substrate 2 after the positional adjustment as mentioned above is used as the mirror element 1, as shown in FIG. 5. The photo-diode 4 is positioned and mounted above the upper side of the quadrangular-pyramid-shaped plating film portion 14A. Electrodes of the photo-diode 4 are connected to wiring electrodes (not shown) on a waveguide circuit by solder. The width of the gap between the end of the optical guide device 3 and the quadrangular-pyramid-shaped plating film portion 14A is 10 μm.

As shown in FIG. 13B, after the mirror element 1 is connected to the optical circuit substrate 2, an electrolytic plating operation may be further carried out to the surface of the plating film 14. Through this Au plating operation, the reflection rate of the mirror element 1 can be made higher than that of the rhodium Rh, resulting in reduction of the coupling loss.

Figure 14:
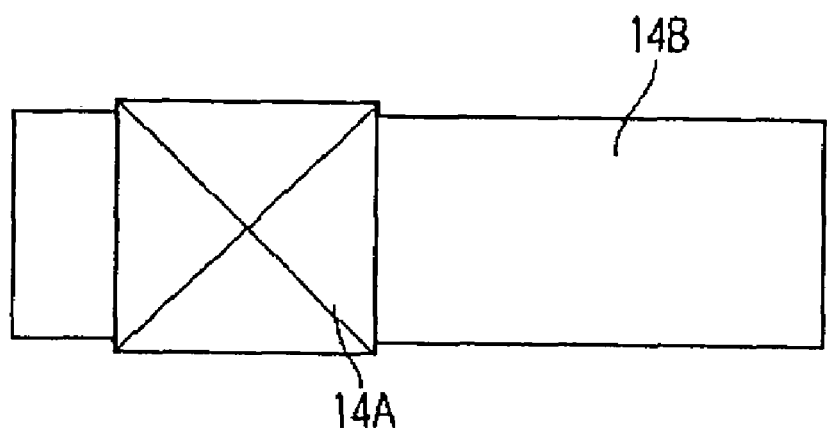
FIG. 14 is a plan view showing a mirror element formed by a third method.

FIG. 14 shows the structure of the mirror element 1 fabricated by the third fabricating method of the present invention. The mirror element 1 is moved from the silicon wafer die 5 to the optical circuit substrate 2, and connected through the gold film to the optical circuit substrate 2. The quadrangular-pyramid-shaped plating film portion 14A of the mirror element 1 differs from the mirror element 1 formed by the second fabricating method in that the material of the above quadrangular-pyramid-shaped plating film portion 14 is changed. In the mirror element 1 according to the second fabricating method, the reflection film is the rhodium film. However, in the mirror element 1 according to the third fabricating method, photosensitive polyimide (PIMEL commercially available from Asahi Chemical Industry Co., Ltd.) is used for the reflection film.

Figure 15:
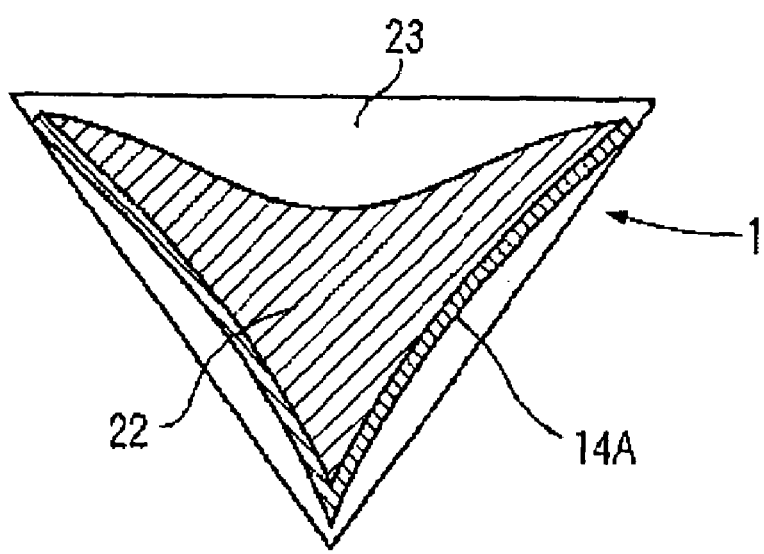
FIG. 15 is a sectional view showing a mirror element formed by the third method.

In FIG. 11G, instead of the formation of the plating film 14, the photosensitive polyimide is coated by use of a spin coat method, and is exposed and developed. Thus, a photosensitive polyimide film is patterned to form the mirror element. Then, the mirror element 1 is connected to the optical circuit substrate 2, similarly to the above-mentioned examples. Thereafter, the silicon wafer die 5 having such a photosensitive polyimide film is heated at the temperature of 350° C. for two hours. The photosensitive polyimide film starts reaction at 350° C., and the volume is reduced or contracted by about 40% in conjunction with the reaction. At a time of such contraction, the top surface of the mirror element 1 in the state shown in FIG. 11H is depressed because of the contraction. At the same time, the plating surface is pulled by residual stress that cannot be relaxed through the depression of the top surface. The copper film is peeled from the silicon wafer die 5 due to this residual stress. The photosensitive polyimide film is not almost deformed in ridgeline portions of the quadrangular pyramid. However, the center of each reflection surface 23 is depressed as shown by hatching 22 in FIG. 15. Such a concave portion forms a concave surface 24 of the mirror element 1. The silicon wafer die 5 is removed from the optical circuit substrate 2, and the mirror element 1 is left on the optical circuit substrate 2. Thus, the mirror element 1 is connected to the optical circuit substrate 2. The process of removal and connection of the mirror element 1 to the optical circuit substrate 2 is as described above.

Figure 16:
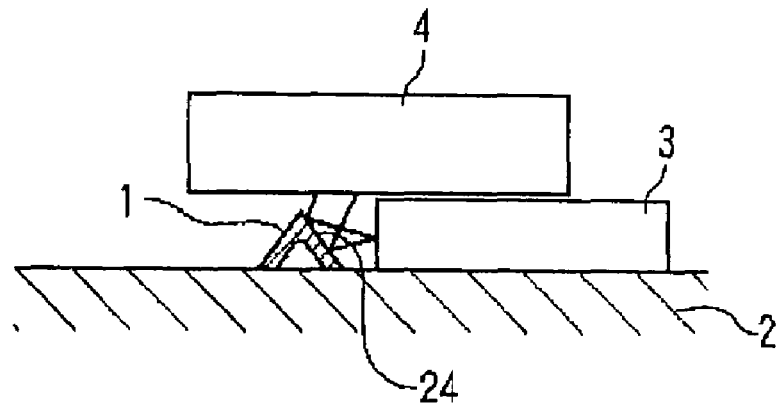
FIG. 16 is a partial sectional view showing an optical circuit on which the mirror element formed by the third method is mounted.

The mirror element 1 on which such a concave surface 24 is formed functions as a concave mirror, as shown in FIG. 16. Light which is outputted from the optical guide device 3 spreads to the angle of about 20 degrees. Thus, the light spreads to the diameter of 32 μmφ in the optical path length of 60 μm. The light is converged by the concave surface 24, and inputted to the photo-diode 4 as a substantially parallel beam. The curvature radius of the concave surface is 160 μm. The light beam inputted to the photo-diode 4 is reduced from 32 μmφ to 28 μmφ. The mirror element according to the third fabricating method can effectively send the light beam to the device, as compared with the mirror elements according to the first and second fabricating methods.

When the above-mentioned polyimide is used as the resin, the resin is never deformed at later steps such as a solder re-flow (heat treatment at 230° C.), and a rinsing operation (contact with organic solvent). Thus, the shape of the mirror element can be kept in the original state at the time of the formation.

Figure 17:
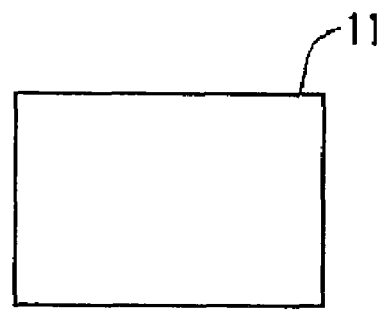
FIG. 17 is a plan view showing a die used when the mirror element is formed by a fourth method.
Figure 18:
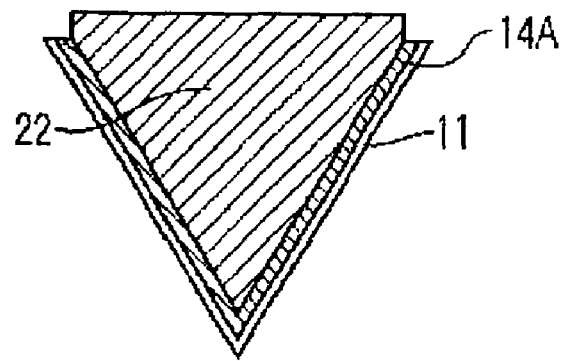
FIG. 18 is a sectional view showing the mirror element formed by the fourth method by use of the die shown in FIG. 17.

FIGS. 17 and 18 show the sections of the mirror element and concave portion 11 of a die fabricated by a fourth fabricating method. Similarly to the mirror element according to the first fabricating method, the silicon etch pit 11 is fabricated, the copper film 12 is formed, and the photo-resist layer 13 is coated and patterned. In an opening 11, only the concave portion of the die is opened as shown in FIG. 17. The electrolytic plating operation is carried out and the photo-resist layer 13 for forming the opening 11 is removed. As shown in FIG. 18, resin having an adhesive property and a photosensitive property is coated to fill a concave portion formed by the plating film 14. Then, the resin film is patterned through the exposure and the development such that resin 22 remains only in the portion of the plating film 14. As the resin, resin composition may be used which contains an active energy line reaction resin and an active energy line polymerization initiator.

As the active energy line reaction resins, the material is suitable which is hardened by a radiation of an active energy line such as an ultraviolet ray, an electronic line, an X-line, and the hardened substance provides an adhesion hardening property through heating treatment. Specifically, phenol novolak type epoxy resin, cresol/volak type epoxy resin, glycylamine type epoxy resin and biphenyl type epoxy resin are preferable which provide the hardening property resulting from the radiation of the active energy line. Especially, the substance is preferably used in which unsaturated-base acid such as acrylic acid, methacrylic acid, crotonic acid, maleic acid, maleic acid monomethyl, maleic acid monopropyl, maleic acid monobutyl, and sorbic acid is made to react with epoxy resin having fluorene skeleton and the reaction result is made into ester. The active energy line polymerization initiator generates radicals by radiating an active energy line, and can promote the polymerization of the active energy line reaction resin on the basis of the physical property of the initiator such as a hydrogen draw reaction and a radical cleavage reaction. The representative substance of the hydrogen draw type is a benzophenone class. A benzildi-methylkethal class is exemplified as the radical cleavage type. Moreover, a compound of a thioxanthone system may be used. One kind or two kinds or more of those materials can be mixed with the active energy line reaction resin.

Figure 19A:
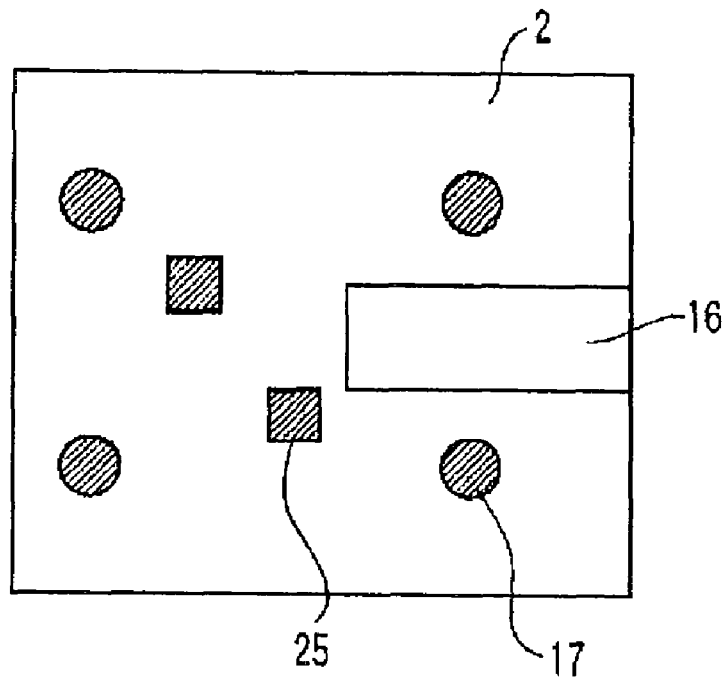
FIG. 19A is a plan view showing a substrate on which the mirror element should be mounted in a second embodiment of the present invention.
Figure 19B:
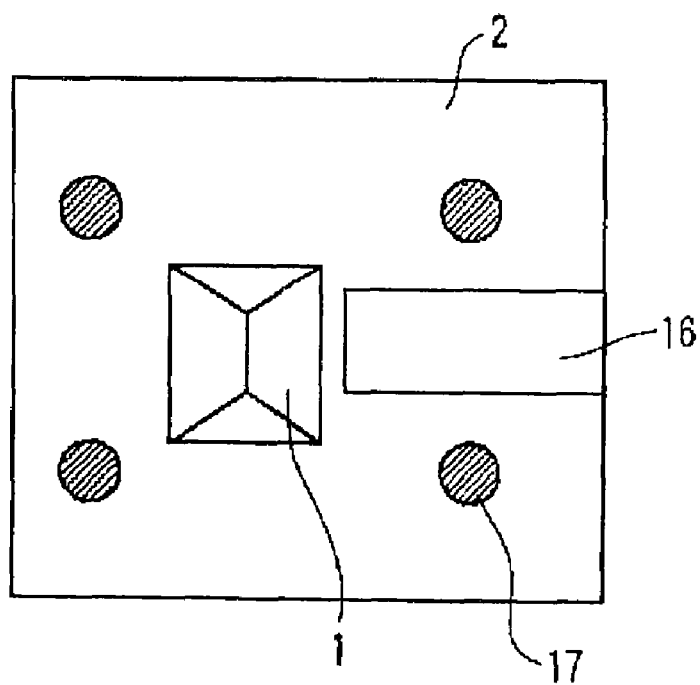
FIG. 19B is a plan view showing the substrate after a mirror element is mounted.

As shown in FIGS. 19A and 19B, the mirror element 1 is connected to the optical circuit substrate 2. As shown in FIG. 19A, positioning marks 25 used to mount the mirror element 1 are provided on the optical circuit substrate 2. At the step shown in FIG. 19B, the silicon wafer die 5 in which the mirror element is formed is positioned and disposed on the optical circuit substrate 2 by a connection unit (not shown). After that, the optical circuit substrate 2 is heated, and the mirror element 1 is connected to the optical circuit substrate 2 by the resin 22. Then, the silicon wafer die 5 is removed from the substrate 2. In this way, the mirror element 1 is left on the optical circuit substrate 2. The resin fills in the mirror element 1 to increase the strength of the mirror element 1 and improve the reliability. Also, it is not necessary to provide the connection portions 14B with the optical circuit substrate 2. Therefore, the space saving can be attained, resulting in reduction of the restriction on an electric surface wiring and the like.

Figure 20:
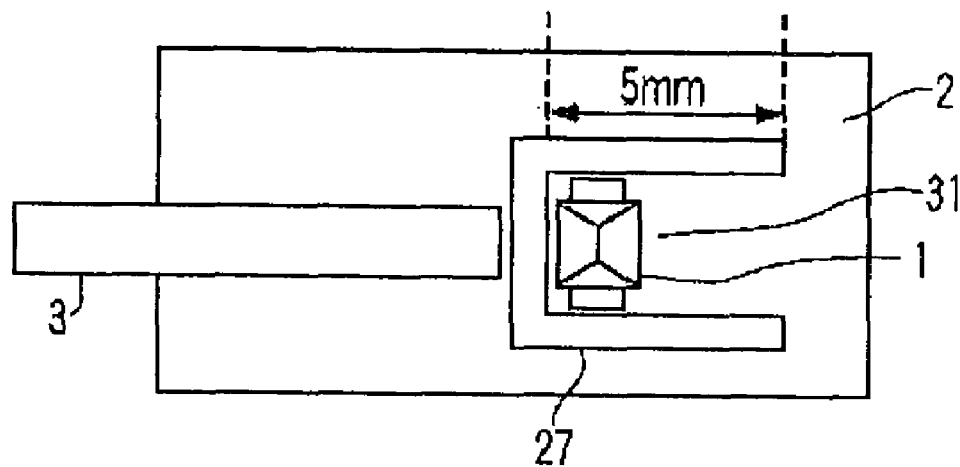
FIG. 20 is a plan view showing an optical circuit according to a third embodiment of the present invention.
Figure 21:
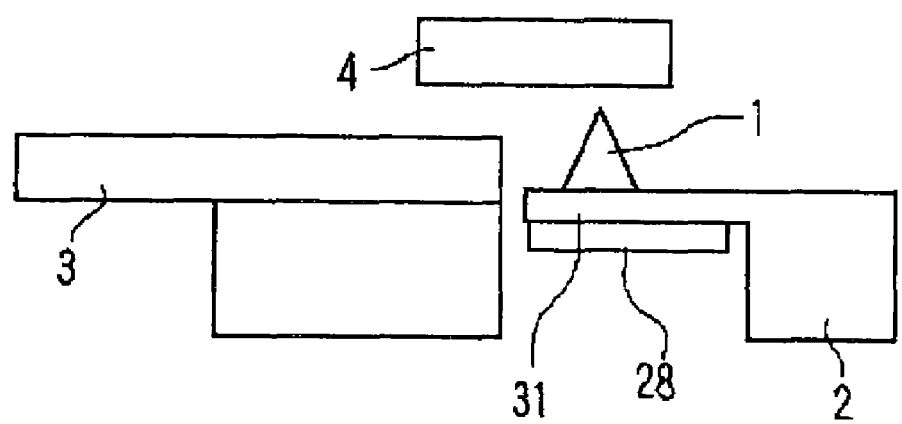
FIG. 21 is a front partial sectional view showing the optical circuit according to the third embodiment of the present invention.

FIGS. 20 and 21 show an optical circuit according to the third embodiment of the present invention. The mirror element 1, a piezoelectric element 28, the optical fiber 3 and an optical element 4 are mounted on the optical circuit substrate 2. The structure of a cantilever is employed in the vicinity of a mount portion 31 of the mirror element 1 as shown in FIG. 21. In short, the vicinity of the mount portion 31 has the structure in which one connection portion is left and the thickness of the mount portion 31 is thin. The piezoelectric element 28 is connected to a back surface of the mount portion of the mirror element 1. The piezoelectric element 28 is composed of zirconic acid lead titanate system material and gold electrodes formed on both main surfaces in the thickness direction. The piezoelectric element 28 operates to expand and contract in response to application of a voltage, so that the mirror element 1 mounted on the mount portion 31 of the cantilever is moved in the height direction. Thus, it is possible to change an optical coupling efficiency between the optical fiber 3 and the optical element 4. If the piezoelectric element 28 is expanded and contracted so that the optical coupling efficiency can be changed between the maximum (on) and the minimum (off), this assembly can be used as a switch.

The optical circuit having the structure shown in FIGS. 20 and 21 is fabricated as follows. Silicon is used for the optical circuit substrate 2. At first, an anisotropic etching process is carried out to the optical circuit substrate 2 to form a mount groove for mounting the optical fiber 3. Next, a dry etching is carried out to front and back surfaces of the optical circuit substrate 2 to form the structure of the cantilever. The length of the cantilever is 5 mm, and the thickness thereof is 50 µm. Here, the surface on which the optical element 4 and the mirror element 1 are mounted is referred to as a front surface, and a surface opposite to the front surface is referred to as a back surface.

Next, the mirror element is formed by the first fabricating method. Subsequently, after a jig is installed below the cantilever, the mirror element 1 is mounted on the optical circuit substrate 2 by a gold press fitting process. Then, the photo-diode PD 4 is mounted on the substrate 2 by solder. Then, a piezoelectric element 28 having the thickness of 50 µm is fixed by adhesive to the back surface of the cantilever of the silicon substrate 2. By this structure, the mirror element 1 can be moved in a height direction by about 20 µm.

After all the parts were mounted, a light beam was inputted to the optical fiber 3, and then a light reception efficiency of the photo-diode PD 4 was measured. At this time, the light reception efficiency was 70%. Then, a voltage was applied to the piezoelectric element 28 to move the mirror element 1 in the height direction such that a light amount received by the photo-diode PD is in the maximum. At this time, the light coupling efficiency was 95%, and it was possible to substantially maximize the efficiency.

In this embodiment, the piezoelectric element is used to drive the mirror element. However, instead of the piezoelectric element, an electric distortion actuator, a magnetic distortion actuator, a phase transition material and the like may be used. Also, the adhesive is used to connect the mirror element 1 and the optical circuit substrate 2. However, the piezoelectric material may be directly formed on the substrate 2.

Figure 22:
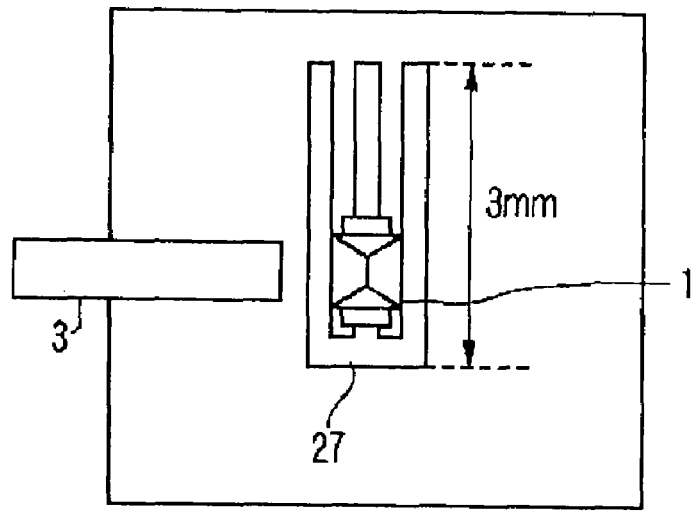
FIG. 22 is a plan view showing an optical circuit according to a fourth embodiment of the present invention.

Also, FIG. 22 shows an optical circuit according to a fourth embodiment of the present invention. Referring to FIG. 22, an assembling structure having two cantilevers may be employed in which piezoelectric elements 28 are adhered to respective back surfaces of the cantilevers. In this case, it is possible to change an angle between a reflection surface of the mirror element 1 and an optical axis. When the length of the cantilever is 3 mm and the piezoelectric elements 28 are driven such that one piezoelectric element is expanded and the other is contracted, the angle between the mirror element 1 and the optical axis can be changed by about 20 degrees.

Figure 23A:
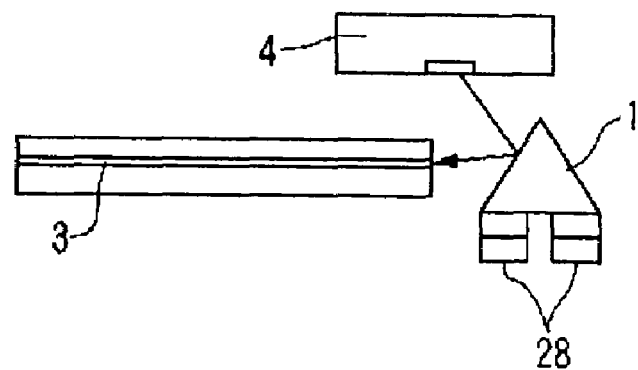
FIGS. 23A and 23B are sectional views showing an operation of an optical circuit according to the fourth embodiment of the present invention.
Figure 23B:
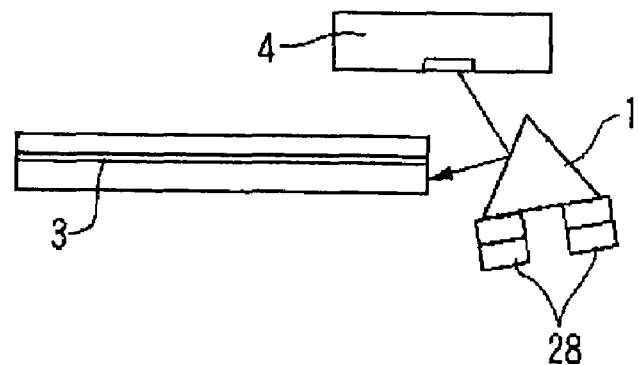

Referring to FIGS. 23A and 23B, a surface light emission type laser is used as the optical element. The assembling structure can be used as a switch by driving the piezoelectric elements and controlling input of an output light from the surface light emission type laser to the optical fiber 3.

An actual example will be described below.

Figure 24:
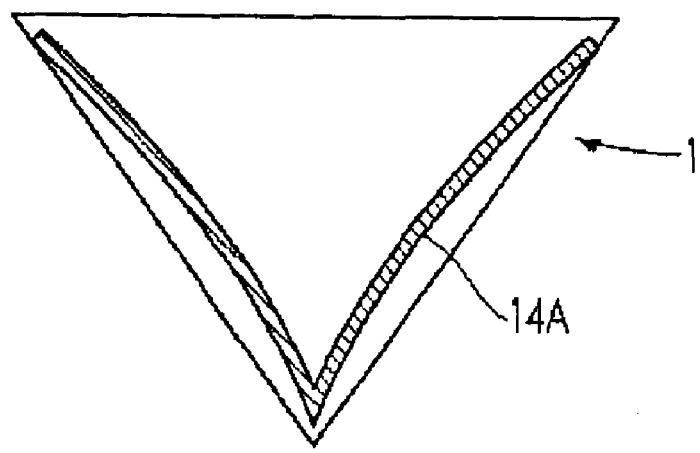
FIG. 24 is a sectional view showing the mirror element formed by the second method in an experiment example 1.

An etch pit is formed in the silicon wafer die 5. A copper film is formed by sputtering and photolithography. A rhodium film is formed to have the film thickness of 0.5 µm by an electrolytic plating method. This electrolytic plating film is formed to have a strong tensile stress. For this tensile stress, the sputtered film is peeled from the silicon wafer die 5 during the plating operation. As a result, a sectional shape shown in FIG. 24 can be obtained as the mirror element. In ridgeline portions having such shape, deformation is never induced for the geometric condition, even in the application of the stress. The application of the tensile stress from the ridgeline causes the reflection surface of the mirror element to receive the deformation stress. Although the tensile stress within the plane acts to protect this deformation, the sum of those forces result in the peeling of the sputtering film, and also result in the deformation of the plating film. After that, a nickel plating film is formed to have the film thickness of 5 µm, and a gold plating film is formed to have the film thickness of 1 µm. After that, as mentioned above, the mirror element is connected to the optical circuit substrate 2. In the thus-formed mirror element 1, the reflection surface is a concave portion, and the curvature radius is 70 µm. In this way, the light beam emitted from the optical guide device can be inputted to the photo-diode to have the diameter of 5 µmφ.

Figure 25:
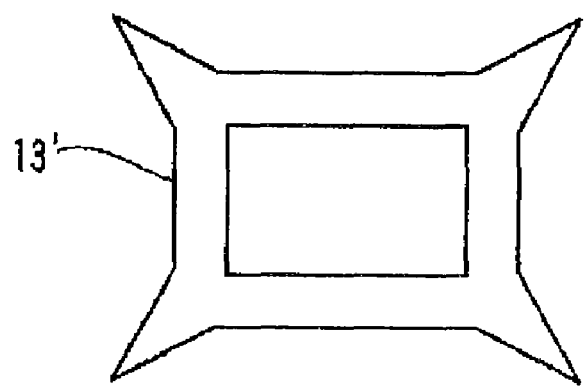
FIG. 25 is a plan view showing a resist pattern used in the experiment example 1.
Figure 26:
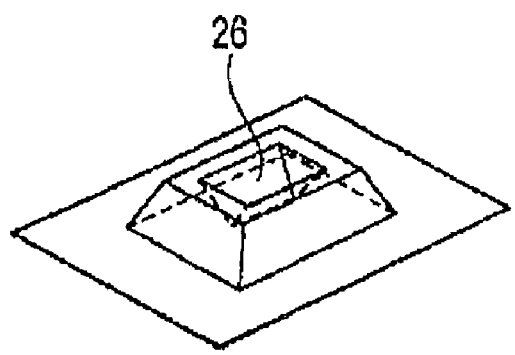
FIG. 26 is a perspective view showing a die used in the experiment example 1.
Figure 27:
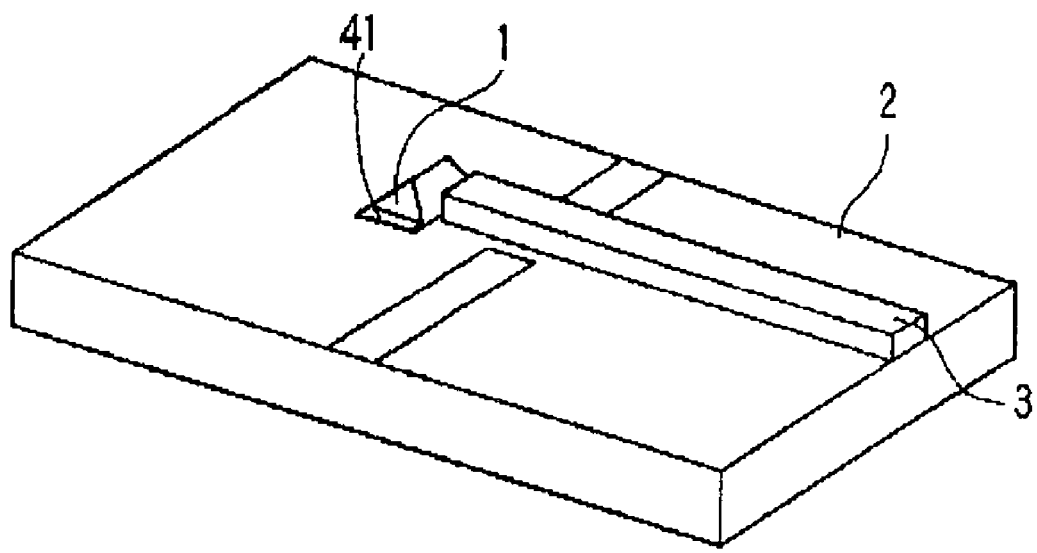
FIG. 27 is a perspective view showing a state that the mirror element formed by use of the die shown in FIG. 26 is mounted on a substrate.

As the resist layer 13 shown in FIG. 6G, a resist layer 13' may be used which is distorted as shown in FIG. 25. The resist layer 13' is rectangular, and formed in a form of ring. One side of the hole is 100 µm, and the other side is 70 µm. When such a resist layer 13' is used to etch the silicon wafer, a trapezoid protrusion having a concave portion 26 in a center is formed as shown in FIG. 26. The mirror element is formed in such a trapezoid concave portion. The formed mirror element 1 has a prism shape as shown in FIG. 27. The mirror element 1 is connected to the optical circuit substrate 2. In this connecting operation, the gold connection protrusion 18 shown in FIG. 13 is unnecessary. The mirror element 1 is connected to a gold electrode 41 located 30 µm from an end portion of the optical guide device 3. In this case, the rebonding operation is unnecessary. Thus, the number of steps can be reduced.

Figure 28:
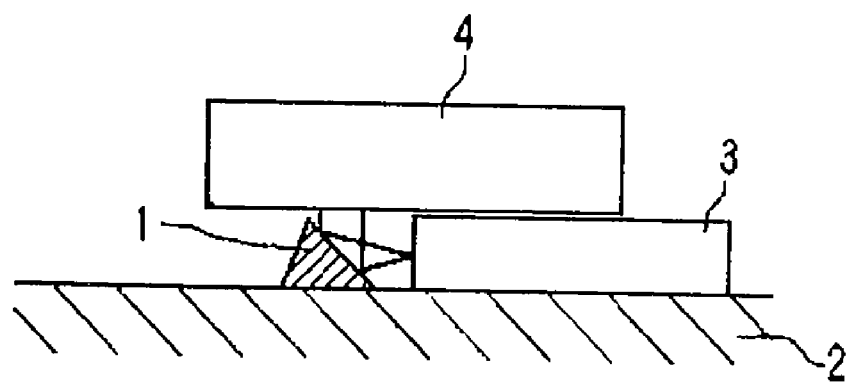
FIG. 28 is a front view showing a partial section of the optical circuit formed by use of the substrate shown in FIG. 27.

A (3, 3, 25) plane is employed as a plane orientation of silicon to be etched. As mentioned above, the etch pit is formed until the appearance of the (111) plane. An angle between the surface of the etch pit and the surface of the silicon is 45 degrees. The rhodium film is formed in the silicon wafer die 5 by the electrolytic plating method so that the rhodium film has the film thickness of 0.5 µm. The mirror element 1 formed thus is connected to the optical circuit substrate 2, as mentioned above, as shown in FIG. 28. In FIG. 28, a surface light emission diode 4 is mounted instead of the photo-diode 4. The reflection surface of the mirror element 1 has the angle of 45 degrees with respect to the end surface of the optical guide device 3. The light beam emitted from the surface light emission diode 4 is reflected on the concave portion of the mirror element, and converged and inputted to the optical guide device 3. The concave portion of the mirror element is gently curved from the center of the reflection surface of the mirror element to the end. The curvature radius of the curved portion to which the light beam is emitted is 70 µm.

FIGS. 29A to 29E show an optical circuit according to the fifth embodiment of the present invention. The method shown in FIGS. 6A to 6H is used in the original state, as the process for fabricating the mirror element 1 shown in FIG. 29A to form the silicon etch pit. However, at the step of FIG. 11G, a Ni layer is formed on the copper film 12 by the electrolytic plating method so that the Ni layer has the film thickness of 5 µm. Then, a Pb/Sn layer is formed on the Ni layer so that the Pb/Sn layer has the film thickness of 5 µm. After the formation of such a plating film 14 in a form of lamination, the photo-resist layer 13 is removed by the solvent, as shown in FIG. 6H. Next, the silicon wafer die 5 is immersed in etching solution composed of sulfuric acid of 5% and hydrogen peroxide of 5%. The copper film 12 is removed by 0.8 µm through the etching process. Through the formation of such a laminated plating layer, the stress is further decreased when the mirror element is peeled from the silicon wafer die 5. Thus, it is possible to further decrease an error occurrence possibility.

Figure 29A:
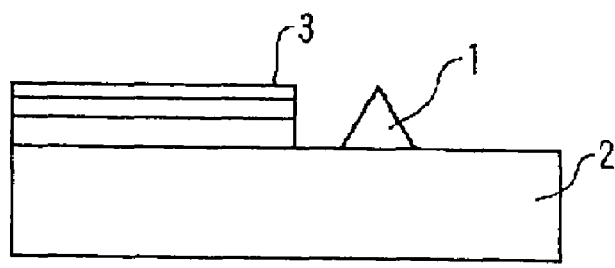
FIGS. 29A to 29E are front sectional views showing a method for fabricating an optical circuit according to a fifth embodiment of the present invention.

The silicon wafer 5 on which the mirror element 1 is formed as mentioned above and the optical circuit substrate 2 on which the optical guide device 3 is formed are positioned by a connection device (not shown). Then, Pb/Sn solder is used to connect the mirror element 1 to the optical circuit substrate 2 on a predetermined position at the temperature of 230° C. Next, the mirror element 1 is peeled from the silicon wafer die 5, and mounted on the optical circuit substrate 2, as shown in FIG. 29A. It should be noted that the mirror element 1 is quadrangular-pyramid-shaped.

Figure 29B:
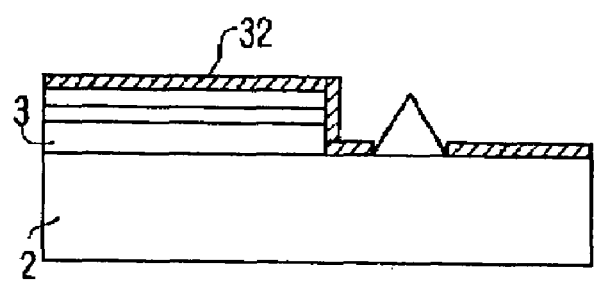
Figure 29C:
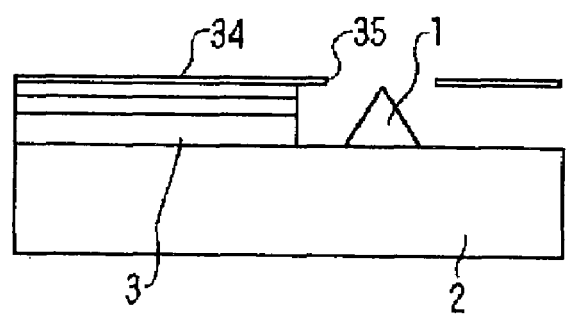
Figure 29D:
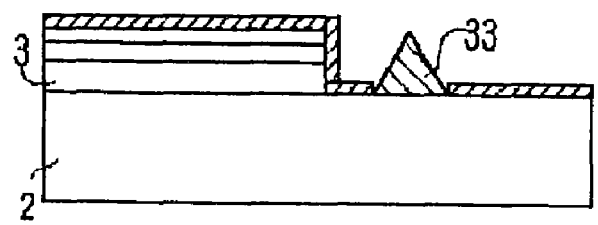
Figure 29E:
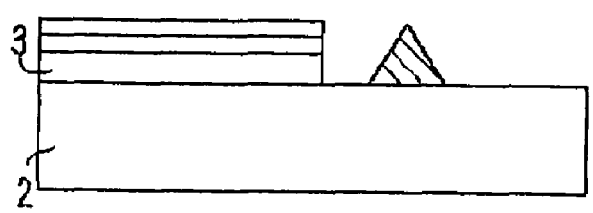

Next, as shown in FIG. 29B, a resist layer 32B is coated on the optical circuit substrate 2 from the top side. Then, as shown in FIG. 29D, a chrome/gold layer 33 is formed by a sputtering method. Instead of gold, a sample in which a film composed of one of aluminum, silver, copper, platinum, titanium and nickel is formed is also fabricated. In order to protect the metal layer as the reflection surface, a germanium/silicon oxide film is formed on the reflection surface. Subsequently, the resist layer 32 is removed as shown in FIG. 29E.

The photo-diode PD 4 was mounted on the substrate 2 of each sample. It was confirmed that when the light beam was inputted to the optical waveguide, the light beam was reflected on the mirror element 1, and the light was inputted to the light receiving section of the photo-diode PD 4. It was also confirmed that the loss caused by the reflection on the mirror element 1 was substantially similar to the reflection rate of the metal used in the reflection surface.

In the above-mentioned examples, after the mirror element 1 is mounted on the substrate, the reflection surface of the mirror element can be formed by use of the metal suitable for the reflection such as gold, without using a wet process. In many cases, the optical circuit substrate uses the optical waveguide in which the optical loss is increased because of absorption of water. However, through the above-mentioned process, the mirror can be mounted on the substrate without any contact between the optical waveguide and the water. Also, by the usage of the solder, the mirror can be mounted on the substrate to have a low heat resistance. The solder material is not limited to the Pb/Sn. As shown in FIG. 29C, by using a metal mask 34 instead of the resist layer 32, and by forming an opening 35 in a portion of the metal mask 34 corresponding to the mirror element, the reflection metal film may be formed.

Figure 30A:
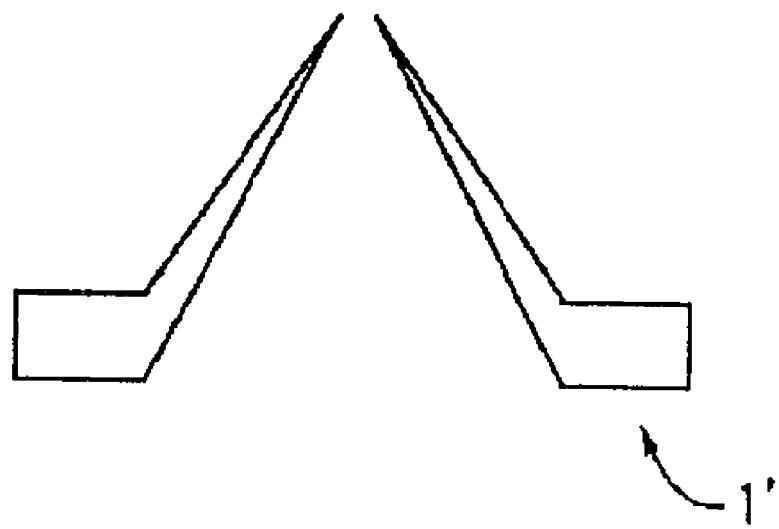
FIGS. 30A and 30B are front views showing states of the mirror elements after fabrication, respectively.
Figure 30B:

The same process as that of the first embodiment, namely, the steps of FIGS. 6A to 6F are used, as they are to fabricate the silicon etch pit. After the step of FIG. 6F, an Au layer having the thickness of 5 µm is formed on the copper film 12 by use of the electrolytic plating process. Moreover, a Ni layer having the thickness of 5 µm is formed on the Au layer. Then, the Au layer having the thickness of 5 µm is formed on the Ni layer. In such a layer structure, there was a case that the lamination plating film is thinly formed near vertex portions corresponding to the concave portion of the silicon wafer die. In this case, when the plating lamination is connected to the substrate and the mirror element is peeled from the silicon wafer, vertex portions of a mirror element 1' are damaged as shown in FIG. 30A. In order to cope with such a problem, in addition to use of a Ni—P layer, the lamination film structure is changed to 1 µm Au/0.2 µm (Ni—p)/5 µm Ni/0.2 µmP/5 µm Au. Accordingly, the film formation property becomes uniform in the entire concave portion. In this case, the mirror element 1 can be mounted on the substrate without any damage to the vertex portions of the mirror element 1, as shown in FIG. 30B.

Figure 31A:
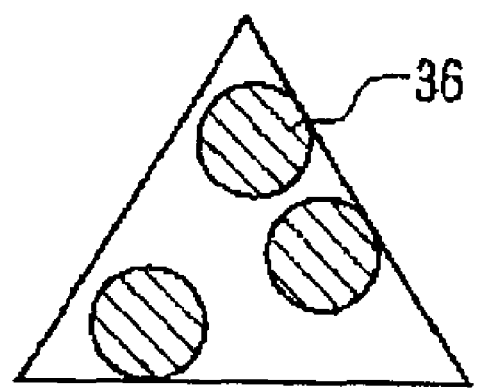
FIGS. 31A and 31B are front views showing states of the mirror elements after fabrication, respectively.
Figure 31B:
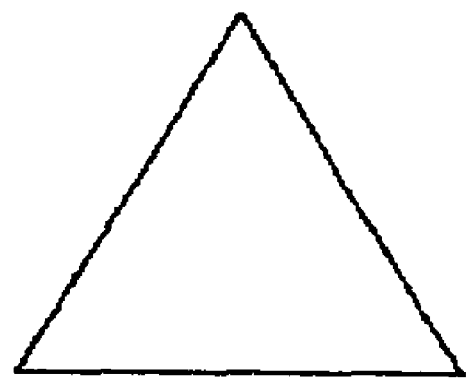

Similarly to the above case, the silicon etch pit is fabricated. After the step of FIG. 6F, an Au layer is formed on the copper film 12 to have the film thickness of 5 µm by use of the electrolytic plating process. Next, when the mirror element is connected to the substrate using the solder of Au/Sn, the solder and Au are diffused to form an alloy 36 on the reflection surface as shown in FIG. 31A. A measured reflectance was 80%, which is decreased to a value less than the reflectance of Au. In order to cope with such decrease, the lamination structure is changed to 5-µm Au/5-µm Pt/1-µm Au. Similarly to the above case, the solder is used to connect the mirror element to the substrate. At this time, as shown in FIG. 31B, alloy was not formed on the reflection film, and the reflection surface is formed of only Au. A measured reflectance was 98%. This reason would be that the Pt middle film prevents that the connection solder is diffused up to Au in the reflection film.

As the result of the fabrication of such a mirror element, an individual prism and lens are not required which are conventionally necessary. Also, the mirror element can be mounted on any substrate.

As mentioned above, the various embodiments and modifications and the various fabricating methods have been described. However, those skilled in the art could understand that they can be mixed and attained in the range of no contradiction.

The optical circuit according to the present invention and the method for fabricating the same can make it possible to fabricate the optical path conversion element at a low cost. The die whose treatment is easy is used, and the mirror element is easily fabricated by use of the die. Such a mirror element can be easily connected to any optical circuit substrate. Moreover, the curvature of the reflection surface of the mirror can be easily formed at the same step.

The invention claimed is:

1. A mirror comprising a multi-layer thin film, wherein said multi-layer thin film comprises a first layer and a second layer,
   said first layer has a reflection surface plane,
   said second layer has a contact plane with a substrate,
   an angle between said reflection surface plane and said contact plane is 45° or equal to an angle between (100) plane orientation and a (111) plane orientation in a silicon crystal, and
   said mirror has an interior concave portion adjacent to the reflection surface plane which is filled with a non-atmospheric material,
   wherein said non-atmospheric material is one of a resin composition containing an active energy line polymerization initiator and an active energy line reaction resin.

2. The mirror according to claim 1, wherein said active energy line reaction resin is one of phenol novolak type epoxy resin, cresol/volak type epoxy resin, glycylamine type epoxy resin and biphenyl type epoxy resin.

3. A mirror comprising a gold layer, wherein said gold layer has a reflection surface plane and a contact plane,
   an angle between said reflection surface plane and said contact plane is 45° or equal to an angle between (100) plane orientation and a (111) plane orientation in a silicon crystal, and
   said mirror has an interior concave portion adjacent to the reflection surface plane which is filled with a non-atmospheric material,
   wherein said non-atmospheric material is one of a resin composition containing an active energy line polymerization initiator and an active energy line reaction resin.

4. The mirror according to claim 3, wherein said active energy line reaction resin is one of phenol novolak type epoxy resin, cresol/volak type epoxy resin, glycylamine type epoxy resin and biphenyl type epoxy resin.

5. An optical circuit comprising:
   a substrate;
   an optical fiber or an optical waveguide provided for said substrate;
   a photodiode or a surface emission type laser provided for said substrate;
   a mirror connected with said substrate;
   at least a cantilever of said substrate, wherein said mirror is installed in a tip portion of said at least a cantilever; and
   an expanding and contracting member which moves said tip portion upwardly and downwardly,
   wherein said mirror comprises a multi-layer thin film, which comprises a first layer and a second layer,
   said first layer is a reflection surface plane, said second layer has a contact plane with a substrate,
   an angle between said reflection surface plane and said contact plane is 45° or equal to an angle between (100) plane orientation and a (111) plane orientation in a silicon crystal and
   said mirror has an interior concave portion adjacent to the reflection surface plane which is filled with a non-atmospheric material.

6. The optical circuit according to claim 5, wherein said expanding and contracting member is one of a piezoelectric element, an electric distortion actuator, a magnetic distortion actuator, and a phase transition material.

7. An optical circuit comprising:
   a substrate;
   an optical fiber or an optical waveguide provided for said substrate;
   a photodiode or a surface emission type laser provided for said substrate; and
   a mirror connected with said substrate,
   wherein said mirror comprises a multi-layer thin film, which comprises a first layer and a second layer,
   said first layer is a reflection surface plane, said second layer has a contact plane with a substrate,
   an angle between said reflection surface plane and said contact plane is 45° or equal to an angle between (100) plane orientation and a (111) plane orientation in a silicon crystal, and
   said mirror has an interior concave portion adjacent to the reflection surface plane which is filled with a non-atmospheric material, wherein said non-atmospheric material is one of a resin composition containing an active energy line polymerization initiator and an active energy line reaction resin.

8. The optical circuit according to claim 7, wherein said active energy line reaction resin is one of phenol novolak type epoxy resin, cresol/volak type epoxy resin, glycylamine type epoxy resin and biphenyl type epoxy resin.

9. An optical circuit comprising:
a substrate;
an optical fiber or an optical waveguide provided for said substrate;
a photodiode or a surface emission type laser provided for said substrate; and
a mirror jointed with said substrate,
wherein said mirror comprises a gold layer, which comprises a reflection surface plane and a contact plane,
an angle between said reflection surface plane and said contact plane is 45° or equal to an angle between (100) plane orientation and a (111) plane orientation in a silicon crystal and
said mirror has an interior concave portion adjacent to the reflection surface plane which is filled with a non-atmospheric material,
wherein said non-atmospheric material is one of a resin composition containing an active energy line polymerization initiator and an active energy line reaction resin.

10. The optical circuit according to claim 9, wherein said active energy line reaction resin is one of phenol novolak type epoxy resin, cresol/volak type epoxy resin, glycylamine type epoxy resin and biphenyl type epoxy resin.

* * * * *